United States Patent [19]

Shinomiya et al.

[11] Patent Number: 5,470,429
[45] Date of Patent: Nov. 28, 1995

[54] SURFACE-TREATING APPARATUS FOR CAN BODY BLANKS

[75] Inventors: Tsutomu Shinomiya; Shunzo Miyazaki; Yasuyuki Tanaka; Shinichi Tsukada; Michiya Tamura, all of Iwatsuki, Japan

[73] Assignee: Hokkai Can Co., Ltd., Tokyo, Japan

[21] Appl. No.: 921,691

[22] Filed: Jul. 30, 1992

[30] Foreign Application Priority Data

| | | | |
|---|---|---|---|
| Jul. 31, 1991 | [JP] | Japan | 3-191986 |
| Aug. 9, 1991 | [JP] | Japan | 3-200826 |
| May 25, 1992 | [JP] | Japan | 4-132643 |
| Jun. 2, 1992 | [JP] | Japan | 4-141604 |

[51] Int. Cl.$^6$ ................................ B32B 27/36
[52] U.S. Cl. .................. 156/510; 156/516; 156/522; 156/526; 156/552; 156/554; 156/555
[58] Field of Search ................ 156/516, 522, 156/526, 552, 554, 555, 324, 264, 265, 271, 353, 358, 498, 510

[56] References Cited

U.S. PATENT DOCUMENTS

| | | | |
|---|---|---|---|
| 2,688,356 | 9/1954 | Conti . | |
| 3,223,574 | 12/1965 | Childs | 156/555 |
| 3,453,169 | 7/1969 | Buck et al. | 156/552 |
| 3,556,909 | 6/1970 | Stegman | 156/521 |
| 3,709,110 | 1/1973 | Lubensky | 156/556 |
| 3,909,342 | 9/1975 | Shook | 83/11 |
| 4,070,214 | 1/1978 | Brown et al. . | |
| 4,163,684 | 8/1979 | Kartanson | 156/231 |
| 4,230,004 | 10/1980 | Jonson | 83/23 |
| 4,256,791 | 3/1981 | Holstrom et al. | 428/77 |
| 4,310,365 | 1/1982 | Elliott et al. | 156/322 |
| 4,341,135 | 7/1982 | Ufermann et al. | 83/23 |
| 4,549,917 | 10/1985 | Jensen, Jr. | 156/353 |
| 4,552,608 | 11/1985 | Hoffman et al. | 226/27 |
| 4,558,615 | 12/1985 | Kuehfuss | 83/367 |
| 4,666,550 | 5/1987 | Spiers et al. . | |
| 4,833,954 | 5/1989 | Jenken | 83/27 |
| 4,864,631 | 9/1989 | Jensen et al. | 156/361 |

FOREIGN PATENT DOCUMENTS

| | | |
|---|---|---|
| 492870 | 7/1992 | European Pat. Off. . |
| 61-116528 | 6/1986 | Japan . |
| 63-203324 | 8/1988 | Japan . |
| 64-70352 | 3/1989 | Japan . |
| 2242159 | 9/1991 | United Kingdom . |

Primary Examiner—W. Gary Jones
Assistant Examiner—Mark De Simone

[57] ABSTRACT

A surface-treating apparatus for can body blanks includes a cutter for cutting an original sheet into can body blank materials having a predetermined width and capable of being divided into plural can body blanks, a conveying path, for conveying the can body blank materials, a material-feeding device for intermittently feeding the blank material to the conveying path, and a heater for heating the blank material. First and second film-feeding devices are provided for respectively feeding a printed biaxially-stretched polyester film and a plain polyester film to both sides of the blank material along its conveying direction. First and second press-bonding devices will respectively successively press-bond under heat both films to both sides of the blank material and coupling the blank materials into a continuous form while defining metal-exposed areas for welding parts at both side edges of both surfaces of the blank materials. A cooler for cooling the continuous sheet of the blank materials, a blank material-cutting device for cutting the continuous sheet in its width direction at the space area between adjacent print patterns on the biaxially-stretched polyester film into surface-treated blank materials, a driver for driving the surface-treated blank material out of the conveying path, and a divider for dividing the surface-treated blank material into individual can body blanks according to the print are also provided.

29 Claims, 18 Drawing Sheets

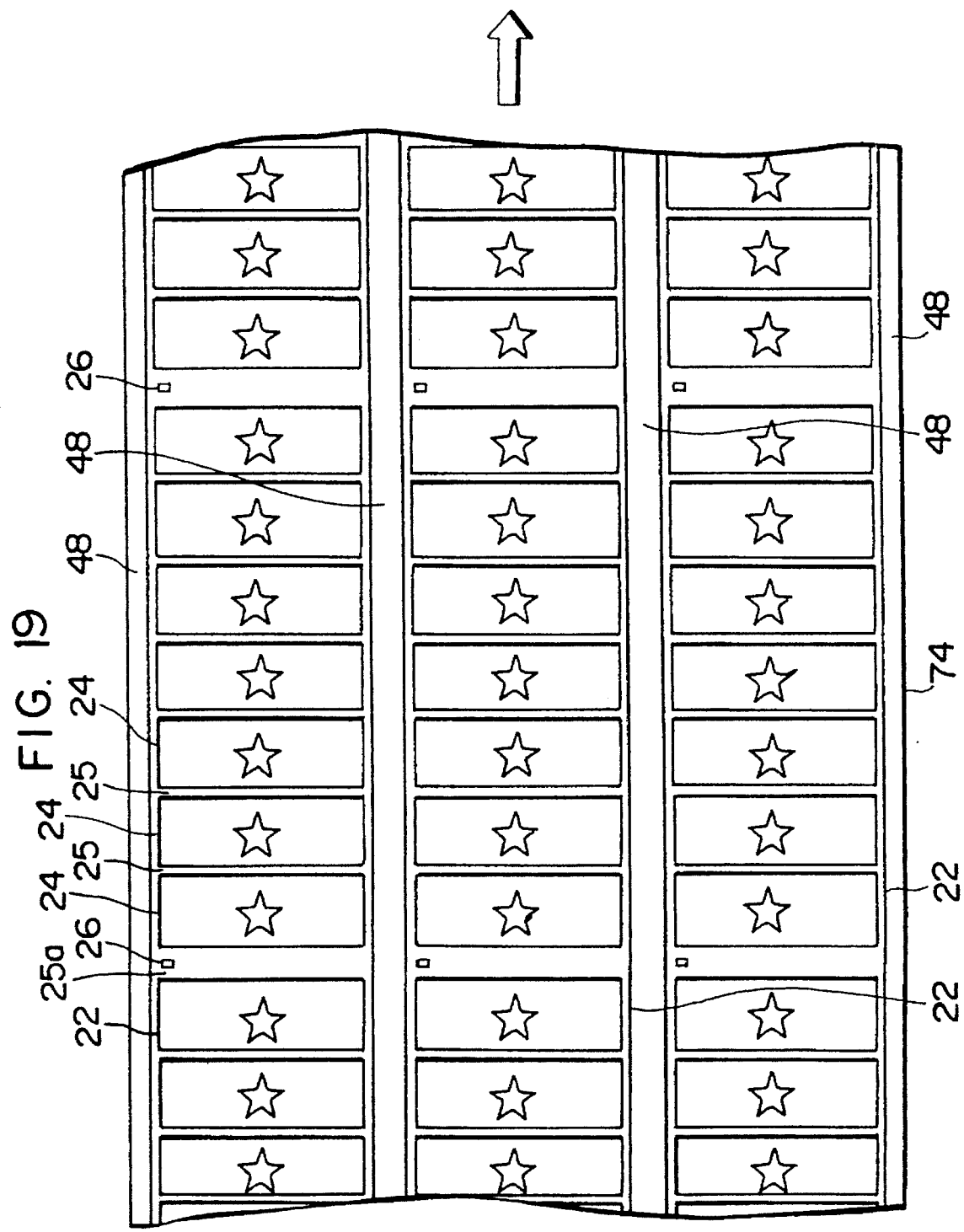

SURFACE-TREATING APPARATUS FOR CAN BODY BLANKS

BACKGROUND OF THE INVENTION

1. Field of the Invention

The present invention relates to a surface-treating apparatus for blanks for can bodies used as in beverage cans and the like, and specifically to a surface-treating apparatus for blanks for can bodies used in welded cans.

2. Description of the Related Art

As metal cans used as containers for beverage, there have been known cans obtained by welding both end edges of a strip-like blank to each other to form a can body and double-seaming individual can ends to both ends of the can body.

In order to prevent the corrosion of a base metal due to the contact of the base metal with the contents in the can and the change in the flavor of the contents, which is caused by metal components being dissolved, the cans as described above have heretofore been coated with a coating material such as an epoxy-phenol resin on the inside thereof. On the other hand, coating has been conducted on the outside of the cans to impart a good aesthetic appearance. In such cans, baking has been carried out in a heating oven whenever coating was completed on each side of the base metal. Therefore, heat and vaporized organic solvents have a tendency to impair the working environment.

There is thus a demand for covering both sides of the base metal with a polyester film. Such covering makes it unnecessary to conduct the coating and baking and hence can be expected to improve the working environment.

According to cans obtained by covering a side of the base metal, which is to be the inside of the cans, with a polyester film, the corrosion of the base metal can be prevented, and moreover the flavor of the contents in the cans can be protected from changing due to the resin being slightly dissolved out of the coating film in the can whose inside has been coated with the resin as described above. According to cans obtained by covering a side of the base metal, which is to be the outside of the cans, with a printed polyester film, on the other hand, a good aesthetic appearance can be given to the outer surfaces of the cans without conducting coating.

SUMMARY OF THE INVENTION

The present invention has been completed in view of the foregoing circumstances and has as its object the provision of a surface-treating apparatus for blanks for can bodies, by which either side of the metal blanks for the can bodies of welded cans used as in beverage cans and the like can be efficiently covered with a polyester film, the corrosion of the base metal can be prevented, and moreover can bodies excellent in aesthetic appearance can be obtained.

To achieve such an object, in the first aspect of this invention, there is thus provided a surface-treating apparatus for can body blanks, comprising original sheet-cutting means for cutting an original sheet into predetermined widths, thereby providing can body blank materials capable of being divided into a plurality of blanks for can bodies; a conveying path for conveying the can body blank materials obtained by the cutting means by separately holding them in nips between a plurality of pairs of feed rolls, each pair of said feed rolls being vertically arranged; material-feeding means for intermittently feeding the can body blank material to the conveying path; heating means provided in the course of the conveying path and adapted to heat the can body blank materials which are conveyed in a row in a conveying direction along the conveying path; the first film-feeding means provided on one side of the can body blank materials which are conveyed in a row in the conveying direction along the conveying path, and adapted to feed a biaxially-stretched polyester film in continuous form, on which a print pattern corresponding to a blank for a single can body and an identification mark have been printed successively at predetermined intervals in a longitudinal direction, and which has a width shorter than the length of the blank for a single can body, to one side of the can body blank material along the conveying direction of the can body blank material; the first press-bonding means for successively press-bonding under heat the biaxially-stretched polyester film fed by the first film-feeding means to the one side of the can body blank material heated by the heating means at a predetermined position according to its traveling, and moreover coupling the can body blank materials forming a row in the conveying direction in a continuous form by the polyester film while defining metal-exposed areas, which are used as welding parts of the blank for a single can body, at edge portions of the can body blank material along both side edges of the polyester film by the press-bonding under heat; the second film-feeding means provided on the other side of the can body blank materials which are conveyed in a row in the conveying direction along the conveying path, and adapted to feed a plain polyester film in continuous length, which has a width shorter than the length of the blank for a single can body, to the other side of the can body blank material along the conveying direction of the can body blank material; the second press-bonding means for successively press-bonding under heat the polyester film fed by the second film-feeding means to the other side of the can body blank material heated by the heating means at a predetermined position according to its traveling, and moreover coupling the can body blank materials forming a row in the conveying direction in a continuous form by the polyester film while defining metal-exposed areas, which are used as welding parts of the blank for a single can body, at edge portions of the can body blank material along both side edges of the polyester film by the press-bonding under heat; a blank material-cutting means arranged on the downstream side of the first and second press-bonding means in the course of the conveying path and adapted to cut the continuous sheet of the blank materials in its width direction at the space area between the adjacent print patterns when the identification marks printed on the biaxially-stretched polyester film on the coupled blank materials are continuously detected to detect a predetermined identification mark, thereby obtaining surface-treated can body blank materials; driving-out means for driving the surface-treated can body blank material out of the conveying path; and dividing means for dividing each of the surface-treated can body blank materials driven out of the conveying path according to the individual print patterns, thereby obtaining a plurality of blanks for can bodies.

According to such first aspect of the present invention, the can body blank materials obtained by cutting the original sheet into the predetermine widths are fed to the feeding path and conveyed in a row along their conveying direction. While conveying them, the biaxially-stretched polyester film having the print patterns and the plain polyester film are respectively press-bonded under heat to both sides of the can body blank material in a state that the can body blank material has been heated.

At this time, since both films are in the continuous form, the can body blank materials forming a row in the conveying direction are coupled successively by both films and conveyed together as a continuous material.

By detecting the identification mark printed on the biaxially-stretched polyester film, this continuous material is then cut in its width direction at the space area between the adjacent print patterns at an interval of a predetermined number of the print patterns on the film, thereby obtaining surface-treated can body blank materials with said both films respectively press-bonded to both sides thereof. Each of the surface-treated can body blank materials is then divided according to the individual print patterns, thereby obtaining a plurality of blanks for a single can body. On these can body blanks, metal-exposed areas, which are used as welding parts, are defined at edge portions of both their surfaces along the respective both side edges of said both polyester films.

According to the first aspect of the present invention, it is therefore possible to obtain efficiently and continuously can body blanks with the polyester films respectively press-bonded to both sides thereof. Further, a can body having an excellent aesthetic appearance and quality can be obtained with ease by welding the metal-exposed areas of such a can body blank to each other with its printed polyester film side and plain polyester film side outside and inside, respectively.

In the first aspect of this invention, it is preferred that when the original sheet is cut into can body blank materials, it should be cut in a direction perpendicular to the calendering direction of the original sheet and can body blanks be obtained from the can body blank material in such a manner that the calendering direction of the original sheet corresponds to the width direction of the can body blanks. This cutting makes it easy to smoothly form can bodies in the form of a cylinder by rounding the individual can body blanks in the width direction thereof.

The printed polyester film may preferably be press-bonded to the can body blank material with its printed side faced to the can body blank material. After this manner, the printed surface becomes protected by the polyester film situated on the outside thereof.

It is further preferred that when the can body blank materials are fed to the conveying path, they be fed to the conveying path in such proper timing that intervals between the can body blank materials forming a row in the conveying direction are aligned with space areas between the print patterns of the printed polyethylene film press-bonded thereto. By this alignment, the can body blank materials coupled in a continuous form by the press-bonding of said both films can be cut at the intervals between the can body blank materials, so that the yield of the can body blanks obtained from the surface-treated can body blank materials provided by this cutting is improved. In this case, the alignment of the intervals between the can body blank materials with space areas between the print patterns of the printed polyethylene film can be carried out with ease by detecting the identification marks printed on the film.

In the first aspect of this invention, it is further possible to arrange the can body blank materials, which form a row in the conveying direction, in plural rows in the width direction to convey them, and to press-bond said both films to the can body blank material in each row. After this manner, many can body blanks can be obtained at a time, so that the production efficiency of the can body blanks can be enhanced.

In this case, particularly, when the printed polyester film is press-bonded to the can body blank material of each row, a polyester film in a continuous form, which has print patterns corresponding to the number of rows of the can body blank materials, is divided in the course of the feeding to the can body blank materials of the individual rows, and the thus-obtained slit films are fed to the can body blank materials of the individual rows. After this manner, it is possible to prevent the misregistration of the print patterns and identification marks between the can body blank materials of the individual rows, and hence to conduct the cutting of the continuous sheet of the can body blank materials and the like after the press-bonding of such slit films together in the plural rows. Therefore, the production efficiency of the can body blanks can be enhanced further.

In the first aspect of this invention, it is further possible to arrange a plurality of printed films and plain films of the same number as that of the printed films in rows in the width direction thereof so as to press-bond them to a can body blank material having a width sufficient for the number of individual can body blanks corresponding to the number of the printed or plain films, and then to divide the surface-treated can body blank material with these films press-bonded thereto after the length of a single can body blank. In this case, the production efficiency of the can body blanks can also be enhanced.

In this case, as described above, a printed polyester film is divided and then fed to the can body blank material to press-bond the slit films to the can body blank material, whereby in the positional relationship between the slit films of the plural rows, which have been press-bonded to the can body blank, the positions of the print patterns and identification marks can be accurately aligned with each other, and the cutting of the continuous sheet of the can body blank materials and the like after the press-bonding of such slit films can hence be conducted with high accuracy at a predetermined position together in the plural rows.

To achieve the above-described object, in the second aspect of this invention, there is also provided a surface-treating apparatus for can body blanks, comprising a conveying path for conveying a can body blank material of a continuous form in the longitudinal direction of the can body blank material by holding it in nips between a plurality of pairs of rolls, each pair of said rolls being vertically arranged; material-feeding means for feeding the can body blank material to the conveying path; heating means provided in the course of the conveying path and adapted to heat the can body blank material conveyed in the longitudinal direction along the conveying path; the first film-feeding means provided on one side of the can body blank material conveyed in the longitudinal direction along the conveying path, and adapted to feed a biaxially-stretched polyester film in continuous form, on which a print pattern corresponding to a blank for a single can body and an identification mark have been printed successively at predetermined intervals in a longitudinal direction, and which has a width shorter than the length of the blank for a single can body, to one side of the can body blank material along the longitudinal direction of the can body blank material; the first press-bonding means for continuously press-bonding under heat the biaxially-stretched polyester film fed by the first film-feeding means to the one side of the can body blank material heated by the heating means at a predetermined position according to its traveling, and moreover defining metal-exposed areas, which are used as welding parts of the blank for a single can body, at edge portions of the can body blank material along both side edges of the polyester film; the second film-feeding means provided on the other side of the can body blank material conveyed in the longitudinal direction along the conveying path, and adapted to feed a plain polyester film in continuous length, which has a width shorter than the length of the blank for a single can body, to the other side of the can body blank material along the longitudinal direction of the can body blank material; the second press-bonding means for continuously press-bonding under heat the polyester film fed by the second film-feeding means to the other side of the can body blank material heated by the heating means at a predetermined position according to its traveling, and moreover defining metal-exposed areas, which are used as welding parts of the blank for a single can body, at edge portions of the can body blank material along both side edges of the polyester film; a blank material-cutting means arranged on the downstream side of the first and second press-bonding means in the course of the conveying path and adapted to cut the can body blank material in its width direction at the space area between the adjacent print patterns when the identification marks printed on the biaxially-stretched polyester film press-bonded under heat to the can body blank material are continuously detected to detect a predetermined identification mark, thereby obtaining surface-treated can body blank materials with said both polyester films respectively press-bonded under heat to both sides thereof; driving-out means for successively driving the surface-treated can body blank material out of the conveying path; and dividing means for dividing each of the surface-treated can body blank materials driven out of the conveying path according to the individual print patterns, thereby obtaining a plurality of blanks for can bodies.

According to such second aspect of the present invention, while conveying the can body blank material in continuous form in its longitudinal direction, the biaxially-stretched polyester film having the print patterns and the plain polyester film are respectively press-bonded under heat to both sides of the can body blank material in a state that the can body blank material has been heated.

By detecting the identification mark printed on the biaxially-stretched polyester film, this can body blank material is then cut in its width direction at the space area between the adjacent print patterns at an interval of a predetermined number of the print patterns on the film, thereby obtaining surface-treated can body blank materials with said both films respectively press-bonded to both sides thereof. Each of the surface-treated can body blank materials is then divided according to the individual print patterns, thereby obtaining a plurality of blanks for a single can body. On these can body blanks, metal-exposed areas, which are used as welding parts, are defined at edge portions of their both surfaces along the respective both side edges of said both polyester films.

According to the second aspect of the present invention, it is therefore possible to obtain efficiently and continuously can body blanks with the polyester films respectively press-bonded to both sides thereof like the first aspect of this invention. Further, a can body having an excellent aesthetic appearance and quality can be obtained with ease by welding the metal-exposed areas of such a can body blank to each other with its printed polyester film side and plain polyester film side outside and inside, respectively.

In the second aspect of this invention, as with the above-described first aspect, the printed polyester film may also preferably be press-bonded to the can body blank material with its printed side faced to the can body blank material to protect the printed surface.

In the second aspect of this invention, it is further possible to arrange a plurality of printed films and plain films of the same number as that of the printed films in rows in the width direction thereof so as to press-bond them to a can body blank material having a width sufficient for the number of individual can body blanks corresponding to the number of the printed or plain films, and then to divide the surface-treated can body blank material with these films press-bonded thereto after the length of a single can body blank. In this case, many can body blanks can be obtained at a time, so that the production efficiency of the can body blanks can be enhanced.

In this case, as with the first aspect, a printed polyester film is divided and then fed to the can body blank material to press-bond the slit films to the can body blank material, whereby in the positional relationship between the slit films of the plural rows, which have been press-bonded to the can body blank, the positions of the print patterns and identification marks can be accurately aligned with each other, and the cutting of the divided can body blank materials and the like after the press-bonding of such slit films can hence be conducted with high accuracy at a predetermined position together in the plural rows. It is therefore possible to enhance the production efficiency of the can body blanks.

In the first and second aspects of the present invention as described above, it is preferable to construct pressure rolls by the feed rolls used in the conveying path so as to feed said both films into a pair of the pressure rolls with the can body blank material to be held in a nip between the pressure rolls interposed therebetween. This makes it possible to simplify the construction of the surface-treating apparatus of the present invention.

The plain polyester film requires no great strength because it is not subjected to printing and may be either an unstretched polyester film or a uniaxially- or biaxially-stretched polyester film. As said both polyester films, may be used those known in the art. However, a polyethylene terephthalate film is preferred from the viewpoint of suitability for covering process and quality of cans to be produced. Incidentally, it is preferable to use a polyester film on which an adhesive has been coated in advance in order to improve its adhesion property.

Other objects and advantages of the present invention will be readily appreciated from the preferred embodiments of this invention, which will be described subsequently in detail with reference to the accompanying drawings which are given by way of illustration only and are therefore not limitative of the present invention.

BRIEF DESCRIPTION OF THE DRAWINGS

FIG. 19 is a plan view illustrating a can body blank material to which the biaxially-stretched polyethylene slit films have been bonded.

DETAILED DESCRIPTION OF THE PREFERRED EMBODIMENTS

Figure 1:
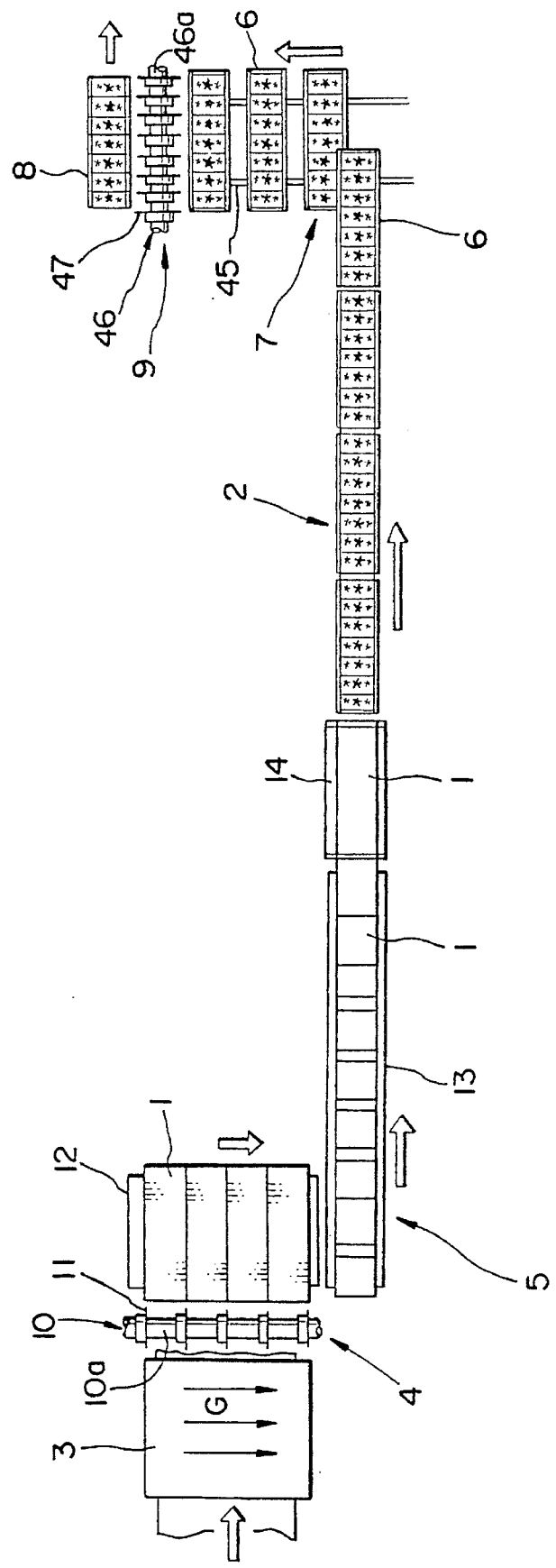
FIG. 1 is a schematic plan view illustrating a surface-treating apparatus for can body blanks according to the first embodiment of the present invention.
Figure 2:
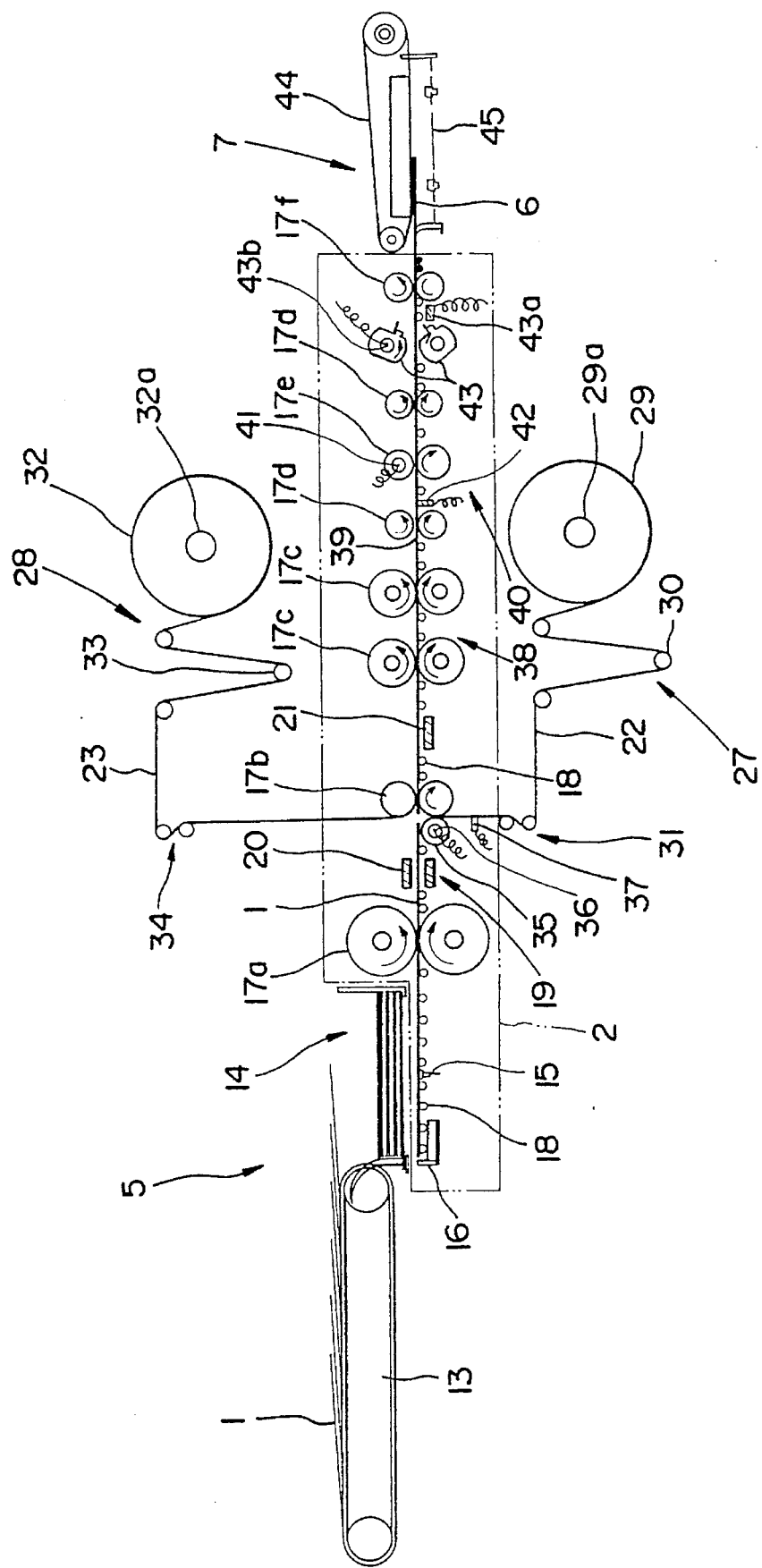
FIG. 2 is a side elevational view illustrating the apparatus of FIG. 1.
Figure 3:
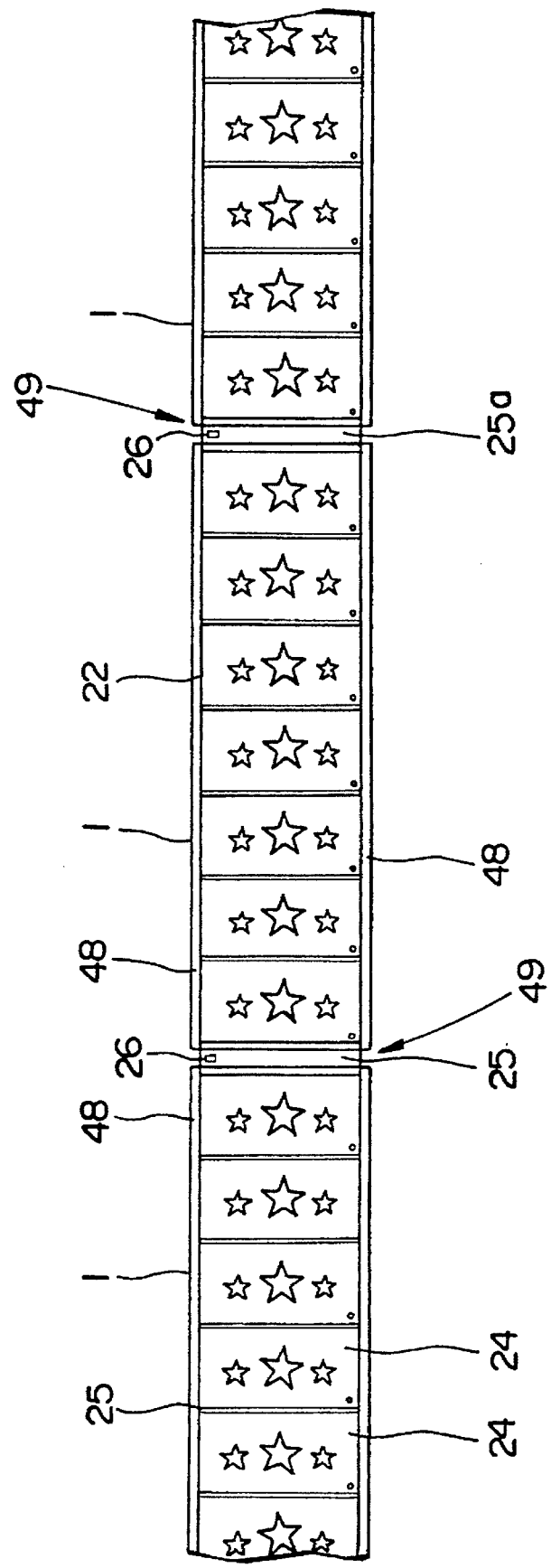
FIG. 3 is a plan view illustrating can body blank materials covered with a polyethylene terephthalate film by the apparatus of FIG. 1.

The first embodiment of the present invention will hereinafter be described by reference to FIGS. 1 through 3. FIG. 1 is a schematic plan view illustrating a surface-treating apparatus for can body blanks according to the first embodiment of the present invention, FIG. 2 is a side elevational view illustrating the surface-treating apparatus, and FIG. 3 is a plan view illustrating can body blank materials covered with a polyethylene terephthalate film by the surface-treating apparatus.

The outline of the surface-treating apparatus of this embodiment will be described. As illustrated in FIG. 1, this apparatus includes a conveying path 2 for conveying can body blank materials 1, and an original sheet-cutting means 4 for cutting an original sheet 3 to obtain the can body blank materials 1 and a material-feeding means 5 for feeding the can body blank material 1 obtained by the cutting of the original sheet 3 to the conveying path 2, which are provided on the upstream side of the conveying path 2. On the downstream side of the conveying path 2, there are provided a driving-out means 7 for driving a surface-treated can body blank material 6, to both sides of which polyethylene terephthalate films have been press-bonded on the conveying path 2 as will be described subsequently, out of the conveying path 2 and a dividing means 9 for dividing the surface-treated can body blank material 6 driven out of the conveying path 2 into individual blanks 8 for a single can body. There are also provided a heating means, pressure rolls (a press-bonding means), a cooling means and a material-cutting means in the course of the conveying path 2, and film-feeding means for respectively feeding polyethylene terephthalate films to be press-bonded to the can body blank material 1 above and below the conveying path 2 though they are not illustrated in FIG. 1.

As illustrated in FIG. 1, the original sheet-cutting means 4 is equipped with a slitter 10 by which the original sheet 3 in the form of a square is cut into predetermined widths. The slitter 10 includes a plurality of rotary knives 11 which have been rotatably supported on a support shaft 10a at predetermined intervals according to the desired width of the can body blank material 1. The original sheet 3 is fed from the direction perpendicular to the axial direction of the support shaft 10a to the slitter 10 and cut into the predetermined widths according to the rotation of the rotary knives 11, thereby providing a plurality of the can body blank materials 1 having a predetermined width from the original sheet 3.

Incidentally, in this embodiment, the can body blank materials 1 obtained by such cutting is formed in such a size that its width is equal to the length of a blank 8 for a single can body, which corresponds to the circumferential direction of a can body (not shown) formed from the can body blank 8, and a plurality of can body blanks 8 (7 blanks in this embodiment) can be given in a row in a longitudinal direction of the can body blank material 1 and in parallel with each other.

The original sheet 3 to be fed to the slitter 10 is rolled in the direction of the arrows G (a direction perpendicular to the rotary knives 11).

As illustrated in FIGS. 1 and 2, the feeding means 5 includes a cross-feed conveyor 12 for conveying the plural can body blank materials 1 obtained by the above-described cutting in the axial direction of the slitter 10 (the width direction of the can body blank material 1), an overlap conveyor 13 for conveying the plural can body blank materials 1 conveyed by the cross-feed conveyor in the longitudinal direction of the can body blank material 1 in a state that they have overlapped with each other, a hopper 14 for temporally stocking the plural can body blank materials 1 fed from the overlap conveyor 13, a suction cup 15 for sucking each of the can body blank materials 1 in the hopper 14 to transfer it on the conveying path 2 and a timing kicker 16 for sending out the can body blank material 1 to the conveying path 2.

As illustrated in FIG. 2, the conveying path 2 includes each pair of feed rolls 17a, 17b, 17c, 17d, 17e, 17f, which are separately hold the can body blank materials 1 in nips therebetween to convey them in their longitudinal direction, said each pair of the feed rolls being arranged vertically. A plurality ok auxiliary rollers 18 for assisting the transfer of the can body blank materials 1 are suitably arranged before and/or behind these rolls 17a–17f.

A heating means 19 for heating the can body blank material 1 is provided at an upstream part of the conveying path 2. This heating means 19 is constructed by the feed rolls 17a, and a high-frequency heater 20 and a high-frequency temperature controller 21, which have been arranged on the downstream side of the feed rolls 17a in that order. In this case, the feed rolls 17a combine rolls for guiding the can body blank material 1, which has been sent out by the timing kicker 16, on the downstream side of the conveying path 2, with induction heating jacket rolls for preheating the can body blank material 1 as a constituent element of the heating means 19.

A pair of pressure rolls 17b, which are arranged vertically and are combined with the feed rolls 17b, are provided between the high-frequency heater 20 and the high-frequency temperature controller 21 on the conveying path 2. The pair of pressure rolls 17b vertically arranged respectively constitute first and second press-bonding means. The pressure rolls 17b separately serve to press-bond under heat a biaxially-stretched polyethylene terephthalate film 22 in the form of a continuous band (hereinafter called "film 22" simply), on which predetermined print patterns have been applied as described below, and a plain polyethylene terephthalate film 23 in the form of a continuous band (hereinafter call "film 23" simply) to the can body bank material 1. The pressure rolls 17b are also constructed so as to successfully conduct temperature-controlling operation.

As illustrated in FIG. 3, print patterns 24 corresponding to the individual blanks 8 for a single can body are successively printed on the film 22 at intervals of a plain area 25 or 25a in the longitudinal direction of the film 22. An eye spot 26 which is an identification mark is printed on the plain areas 25a, which are provided at an interval of a predetermined number of the print patterns 24 (7 patterns in this embodiment).

Both films 22, 23 are formed in such a way that their widths are shorter than the width of the can body blank material 1 (the length of the can body blank 8). The plain area 25a of the film 22 is defined somewhat wider than the plain area 25.

As illustrated in FIG. 2, a film-feeding means 27 for feeding the printed film 22 to the pressure roll 17b is provided below the conveying path 2, and a film-feeding means 28 for feeding the plain film 23 to the pressure roll 17b is provided above the conveying path 2.

The film-feeding means 27 for feeding the film 22 includes a film coil 29 obtained by winding the film 22 in the form of the continuous band, dancer rolls 30 provided between the film coil 29 and the pressure roll 17b to control the tension of the film 22 drawn out of the film coil 29 and an edge controller 31 for adjusting the position of the film 22 to the can body blank material 1 in the width direction of the film 22.

As with the film-feeding means 27, the film-feeding means 28 for feeding the film 23 also includes a film coil 32, dancer rolls 33 and an edge controller 34.

These film-feeding means 27, 28 serve to feed, respectively, the films 22, 23 along the conveying direction of the can body blank material 1 from film coils 29, 32 into a nip between the pair of pressure rolls 17b, which have been arranged vertically, through the dancer rolls 30, 33 and the edge controller 31, 34.

The film coils 29, 32 are separately equipped with a tension controller (not illustrated) at their shaft parts 29a, 32a so as to control the tension of the films 22, 23 drawn out of the coils 29, 32, respectively. These tension controllers are constructed so as to control the tension of the films 22, 23 in association with the dancer rolls 30, 33, respectively.

An encoder roll 35 rotating in close contact and in association with the pressure roll 17b through the film 22 is arranged at a position adjacent to the pressure roll 17b. The encoder roll 35 includes a pulse encoder 36. An eye spot sensor 37 is provided in the vicinity of the encoder roll 35 and in an opposing relation with the eye spot 26 printed on the film 22 to be fed to the pressure rolls 17b. In this case, the pulse encoder 36 and eye spot sensor 37 are connected to a feed controlling unit (not shown) provided in the material-feeding means 5 in order to control the timing to feed the can body blank material 1 from the hopper 14 to the conveying path 2.

A cooling means 38 for cooling the can body blank material 1 with the films 22, 23 press-bonded thereto is provided on the downstream side of the high-frequency temperature controller 21 on the conveying path 2. The cooling means 38 are composed of two pairs of cooling rolls 17c, 17c which are combined with feed rolls for conveying path 2 and have been disposed successively.

A cutting means 40 for cutting a continuous sheet 39 (see FIG. 3) of the can body blank materials 1, which has been obtained by coupling the blank materials 1 with each other by the films 22, 23 as will be described subsequently, is provided on the downstream side of the cooling rolls 17c on the conveying path 2. The cutting means 40 includes two pairs of even speed feed rolls 17d, 17d for conveying the coupled can body blank materials 1 (continuous sheet 39) at the same speed, a pair of even speed feed rolls 17e provided between the even speed feed rolls 17d, 17d and equipped with a pulse encoder 41, an eye spot sensor 42 provided between the even speed feed rolls 17d, 17d and at a downward site of the conveying path 2, a pair of knife cylinders 43 (cutting means) arranged vertically on the downstream side of the even speed feed rolls 17d, 17d and adapted to cut the coupled can body blank materials 1 (continuous sheet 39), a knife-origin sensor 43a provided in the vicinity of the knife cylinder 43 and adapted to detect whether a knife attached to the knife cylinder 43 is situated at a position coming into no contact with the can body blank material 1 (continuous sheet 39), and an angular-velocity encoder for knife 43b, which has been attached to the knife cylinder 43 to detect the rotational angle of the knife cylinder 43 so as to measure the angular velocity of the knife.

The eye spot sensor 42 is displaced in an opposing relation with the eye spot 26 on the side of the film 22 of the continuous sheet 39 of the can body blank materials 1, which has been obtained by coupling the blank materials 1 with each other by the films 22, 23 as will be described subsequently. The pulse encoder 41, the eye spot sensor 42, the knife cylinders 43, the knife-origin sensor 43a and the angular-velocity encoder for knife 43b are connected to a cutting control unit (not shown). The knife cylinders 43 are driven under control of the cutting control unit as will be described subsequently, whereby the continuous sheet 39 is cut into predetermined lengths.

On the downstream side of the knife cylinders 43, the conveying path 2 is terminated. At this terminal, there is provided feed rolls 17f for guiding the surface-treated can body blank material 6 obtained by cutting the continuous sheet 39 by the knife cylinders 43 to the driving-out means 7.

As illustrated in FIGS. 1 and 2, the driving-out means 7 includes a discharge conveyor 44 continuously provided on the downstream side of the feed rolls 17f and a cross-feed conveyor 45 disposed on the downstream side of the discharge conveyor 44. The discharge conveyor 44 is provided so as to transfer the surface-treated can blank material 6 obtained through the cutting means 40 to the cross-feed conveyor 45. As an example, a suction conveyor which sucks the surface-treated can body blank material 6 to convey it can be used. The cross-feed conveyor 45 conveys the surface-treated can body blank material 6 transferred by the discharge conveyor 44 in a direction (the width direction of the surface-treated can body blank material 6) perpendicular to the conveying direction of the conveying path 2 and feeds it to the dividing means 9.

As illustrated in FIG. 1, the dividing means 9 is composed of a slitter 46 arranged on the downstream side of the cross-feed conveyor 45. The slitter 46 servers to divide the surface-treated can body blank material 6 into individual blanks 8 for a single can body. On a support shaft 46a thereof, a plurality of rotary knives 47 are rotatably supported at predetermined intervals according to the width of the can body blank 8, which corresponds to the height of a can body. The slitter 46 cuts the surface-treated can body blank material 6 fed from the cross-feed conveyor 45 in a direction perpendicular to the support shaft 46a into the predetermined widths according to the rotation of the rotary knives 47.

The operation of the surface-treating apparatus according to this embodiment will next be described.

As illustrated in FIG. 1, the original sheet 3 is first fed to the slitter 10 from the direction perpendicular to its support shaft 10a. The original sheet 3 has a size of 829 mm×875 mm by way of example, and is cut into blank materials having a width corresponding to the circumferential length of a desired can body, for example, a width of 206.4 mm by the slitter 10. On the support shaft 10a of the slitter 10, five rotary knives 11 are rotatably supported at even intervals so as to give four can body blank materials 1 having a width of 206.4 mm and a length of 875 mm from the original sheet 3 having a width of 829 mm. The original sheet 3 is cut according to the rotation of these rotary knives 11.

In this case, the original sheet 3 has been rolled in the direction indicated by the arrows G in FIG. 1 and is fed to the slitter 10 in a state that the calendering direction has become perpendicular to the rotary knives 11 of the slitter 10. In general, since it is advantageous to cut a metal sheet in a direction perpendicular to the calendering direction of the metal sheet when the cutting distance is long, the original sheet 3 is fed in such a manner that the calendering direction G intersects with the rotary knives 11 of the slitter 10 at right angle as described above, thereby cutting it.

Accordingly, the width direction of the can body blank materials 1 obtained by this cutting corresponds to the calendering direction.

The can body blank materials 1 obtained by such cutting are conveyed by the cross-feed conveyor 12 in the width direction of the can body blank material 1 and further transferred from the cross-feed conveyor 12 to the overlap conveyor 13. As illustrated in FIG. 2, the can body blank materials 1 transferred to the overlap conveyor 13 are conveyed in the longitudinal direction of the can body blank material 1 in a state that they have overlapped with each other and guided to the hopper 14. They are temporarily stocked in the hopper 14. At this time, the can body blank materials 1 are stacked and carried in the hopper 14 in such a manner that their longitudinal direction corresponds to the conveying direction in the conveying path 2. Each of the can body blank materials 1 stocked in the hopper 14 are then sucked by the suction cup 15 provided under the hopper 14 to take it out of the hopper 14 and then transferred on the auxiliary rollers 18 provided at an upstream part of the conveying path 2.

The can body blank material 1 transferred on the auxiliary rollers 18 is successively sent out in its longitudinal direction at proper intervals to the feed rolls 17a by the timing kicker 16 provided at the upstream end of the conveying path 2. Therefore, the can body blank materials 1 are conveyed in a row in the conveying direction along the conveying path 2. The timing kicker 16 is operated in such a manner that the print patterns 24 printed on the film 22, which will be press-bonded to the can body blank material 1 in the subsequent process as described below, correspond to the can body blank material 1 in a positional relation.

The feed rolls 17a hold the can body blank material 1 up and down and feed it on the downstream side of the conveying path 2 according to their rotation. The can body blank material 1 fed to the conveying path 2 is preheated by the feed rolls 17a combined with the induction heating jacket rolls and then guided to the high-frequency heater 20. The can body blank material 1 is heated by the high-frequency heater 20 in such a manner that its surface temperature falls within a range of 180°–200° C.

The can body blank material 1 thus heated is then guided to the pressure rolls 17b.

At this time, the films 22, 23 are respectively fed from the film coils 29, 32 to the pressure rolls 17b through the dancer rolls 30, 33 and edge controller 31, 34. At this time, the films 22, 23 are fed to the pressure rolls 17b together with the can body blank material 1 with the can body blank material 1 interposed therebetween and are simultaneously respectively press-bonded under heat to both sides of the can body blank material 1 according to the traveling of the can body blank material 1, which is attendant on the rotation of the pressure rolls 17b.

In this case, the film 22 is fed with its printed side faced to the can body blank material, so that the printed surface is press-bonded under heat to the can body blank material 1. An advantageous effect that the printed surface is protected by the film situated on the outside thereof can be achieved by press-bonding the film 22 with its printed surface inside as described above.

As described above, the print patterns 24 are printed on the film 22 in a row at intervals of a plain area 25 or 25a in the longitudinal direction of the film 22. An eye spot 26 is printed on the plain areas 25a. As illustrated in FIG. 3, the film 22 is successively press-bonded to the can body blank materials 1 along the longitudinal direction of the can body blank material 1 according to the traveling of the can body blank material 1. At this time, metal-exposed areas 48, which are used as welding parts, are defined at edge portions of the can body blank material 1 along both side edges of the film 22. As with the film 22, the plain film 23 is also successively press-bonded to the can body blank materials 1 at an opposed side to the surface, to which the film 22 is press-bonded, along the longitudinal direction of the can body blank material 1 though not illustrated, thereby defining metal-exposed areas, which are used as welding parts, at edge portions of the can body blank material 1 along both side edges of the film 23.

By the above-described press-bonding of the films 22, 23, the plurality of the can body blank materials 1, which form a row in their conveying direction, are coupled in a continuous form by the continuous films 22, 23, thereby forming a continuous sheet 39 of the can body blank materials 1, which has joints 49 by the films 22, 23 at individual space areas between adjacent can body blank materials 1. Incidentally, the metal-exposed areas 48 are used as welding parts upon production of can bodies from the can body blanks 8 obtained in this embodiment.

In the continuous sheet 39 of the can body blank materials 1 with the can body blank materials 1 coupled with each other in a continuous form as described above, the film 22 is press-bonded to the can body blank materials 1 in such a manner that the position of the plain area 25a of the film 22 corresponds to the position of the joint 49 between the can body blank materials 1 and the print pattern 24 does not extend to the joint 49. In the apparatus according to this embodiment, the feed of the can body blank materials 1 to the conveying path 2 is controlled so as to press-bond the film 22 in this manner.

Namely, in the apparatus of this embodiment, the timing kicker 16, pulse encoder 36 and eye spot sensor 37 are connected to a feed control unit (not shown) in the material-feeding means 5, and the feed rolls 17a and pressure rolls 17b are preset so as to convey the can body blank material 1 fed to the conveying path 2 at a predetermined rate. The encoder roll 35 is rotated in synchronism with the pressure rolls 17b.

The pulse encoder 36 oscillates a pulse at certain intervals whenever the film 22 is sent to the pressure rolls 17b. This pulse is inputted into the feed control unit. On the other hand, when the film 22 is fed to the pressure rolls 17b, the eye spot 26 printed on the film 22 is first detected by the eye spot sensor 37, and a detection signal is sent to the feed control unit. When the feed control unit receives the detection signal on the eye spot 26 from the eye spot sensor 37, it starts counting the pulse to count the number of pulses oscillated by the pulse encoder 36 from the receiving of a detection signal on one eye spot 26 to the receiving of a detection signal on the next eye spot 26, thereby calculating the feed rate of the film 22 from the rotating speed of the encoder roll 35 and the number of pulses oscillated.

When the feed control unit receives the predetermined number of detection signals on the eye spot 26, an operation command is outputted into the timing kicker 16, whereby the can body blank material 1 is caused to feed to the conveying path 2 by the timing kicker 16. After such a manner, the can body blank material 1 is fed to the conveying path 2 at an interval of the predetermined number of the eye spots 26 printed on the film 22 and conveyed at the predetermined rate. Therefore, the film 22 is press-bonded to the can body blank material 1 at a position of the pressure rolls 17b 1 in such manner that the position of the joint 49 between the can body blank materials 1 corresponds to the position of the plain area 25a of the film 22.

With respect to said both films 22, 23, a biaxially-stretched film is used as the film 22 because it is printed on its surface. On the other than, the film 23 requires no great strength because it is not subjected to printing, and hence may be either an unstretched film or a uniaxially- or biaxially-stretched film.

In the process of the press-bonding under heat, it is possible to avoid rapid cooling of the heated can body blank material 1 due to its contact with the film 22, 23 and pressure rolls 17b because the pressure rolls 17b are constructed so as to successfully conduct temperature-controlling operation. Therefore, both films 22, 23 can be smoothly press-bonded to the can body blank material 1.

The continuous sheet 39 of the can body blank materials 1, which has been obtained in the above-described manner, is heated by the high-frequency temperature controller 21. Since the continuous sheet 39 of the can body blank materials 1 is kept to a temperature ranging from 180° to 200° C. owing to its heating by the high-frequency temperature controller 21, the adhesion property of the films 22, 23 to the can body blank materials 1 is improved.

Thereafter, such a continuous sheet 39 of the can body blank materials 1 is guided to the cooling rolls 17c, 17c to cool it to room temperature and then introduced to the cutting process, thereby cutting it at the joints 49.

The continuous sheet 39 of the can body blank materials 1 is formed by coupling a plurality of the can body blank materials 1 with each other by the films 22, 23. Therefore, the joints 49 are formed by only the films 22, 23 and hence the joints are soft. Accordingly, the hard portions at which the can body blank materials 1 are held between the films 22, 23 are delicately different in conveying rate from the joints 49 between the can body blank materials 1. In the apparatus of this embodiment, the operation of the knife cylinders 43 is hence controlled in order to accurately cut the continuous sheet 39 of the can body blank materials 1 at joints 49.

Namely, in the apparatus of this embodiment, the pulse encoder 41, eye spot sensor 42, knife cylinders 43, knife-origin sensor 43a and angular-velocity encoder for knife 43b are connected to the cutting control unit (not shown) in the cutting means 40. The feed rolls 17d and 17e are rotated at an even speed in synchronism with each other, and preset so as to convey the can body blank material 1 at a predetermined rate. The pulse encoder 41 oscillates a pulse at certain intervals whenever the can body blank material 1 is sent by the even speed feed rolls 17e. This pulse is inputted into the cutting control unit.

In the cutting control according to this embodiment, when a predetermined eye spot 26 printed on the film 22, which has been press-bonded to the can body blank material 1, is first detected by the eye spot sensor 42, its detection signal is sent to the cutting control unit. When the cutting control unit receives the detection signal on the eye spot 26 from the eye spot sensor 42, it starts counting the number of pulses oscillated by the pulse encoder 41, thereby calculating the traveled distance of the can body blank materials 1 (the continuous sheet 39) from the number of pulses.

When the number of pulses oscillated reaches a predetermined number after the cutting control unit receives the detection signal on the eye spot 26, the cutting control unit judges according to the data inputted in advance that a distance until a joint 49 of the continuous sheet 39 of the can body blank materials 1 arrives at a cutting position has corresponded to a distance until the knife cylinders 43 are rotated and their knives arrive at the cutting position, and hence outputs a start command to the knife cylinders 43.

The knife cylinders 43 generally wait at positions where their knives do not come into contact with the continuous sheet 39 being conveyed along the conveying path 2, and start rotating according to the data inputted in advance when the start command is received. At this time, the angular velocity of the knives attached to the knife cylinders 43 is measured by the angular-velocity encoder for knife 43b and inputted into the cutting control unit. The cutting control unit compares the angular velocity with the data inputted in advance. When the angular velocity of the knives is not appropriate, the cutting control unit corrects it by outputting a correction command to the knife cylinder 43.

The continuous sheet 39, which is being conveyed at a predetermined speed by the even speed rolls 17d and 17e, is cut by the knives attached to the knife cylinders 43 together with the film 23 at a position of its joint 49, i.e., a position of the plain area 25a of the film 22.

The knife cylinders 43 continue to rotate until the knife-origin sensor 43a detects the knife attached to the knife cylinder 43 even after cutting out a can body blank material 1. The knife-origin sensor 43a detects the knife and then outputs a detection signal into the cutting control unit. As a result, the cutting control unit judges that the knife attached to each of the knife cylinders 43 has arrived at a position where it does not come into contact with the can body blank material 1 and the knife cylinders 43 have returned to the waiting position, and hence stops the rotation of the knife cylinders 43.

In the cutting process as described above, surface-treated can body blank materials 6 with the films 22, 23 respectively press-bonded to both sides thereof are provided successively, each of said surface-treated can body blank materials 6 corresponding to one can body blank material 1 (see FIG. 1). The length of the film 22 press-bonded to each of the surface-treated can body blank materials 6 corresponds to a predetermined number of the print patterns 24 (7 patterns in this embodiment) which have been printed on the film 22. The surface-treated can body blank materials 6 are successively driven out of the conveying path 2 at its downstream end in a direction perpendicular to the conveying direction of the conveying path 2 by the discharge conveyor 44 and transferred to the cross-feed conveyor 45.

Each of the surface-treated can body blank materials 6 is conveyed in the direction perpendicular to the conveying direction of the conveying path 2 by the cross-feed conveyor 45 and divided into individual blanks 8 for a single can body by the slitter 46 provided at the downstream end of the cross-feed conveyor 45. Eight rotary knives 47 are supported on the support shaft 46a of the slitter 46 at even intervals corresponding to the width of the print pattern 24 (corresponding to the height of the can body) in parallel with the conveying direction of the cross-feed conveyor 45. The surface-treated can body blank material 6 is divided at its plain areas 25 by the rotation of the rotary knives 47, thereby obtaining a plurality of blanks 8 for a single can body.

According to the surface-treating apparatus of this embodiment, as described above, it is possible to obtain efficiently can body blanks 8 with the films 22, 23 respectively press-bonded to both sides thereof. When the film 22 is press-bonded to the can body blank material 1 in particular, the timing to feed the film 22 to the pressure rolls 17b is detected through the eye spots 26, and the timing to feed the can body blank material 1 to the conveying path 2 is controlled according to its detection. It is therefore possible to press-bond the film 22 to the can body blank material 1 in such a manner that the space area between the can body blank materials 1 which form a row in the conveying direction of the conveying path 2 corresponds to the plain area 25a between the print patterns 24 on the film 22. Further, when the continuous sheet 39 of the can body blank materials 1 is cut, the timing to drive the knife cylinders 43 is controlled according to the detection of the eye spot 26 on the film 22, whereby the continuous sheet 39 can be accurately cut at the plain area 25a between the can body blank materials 1. It is therefore possible to assuredly provide a desired number of can body blanks from a can body blank material 1.

In the can body blank 8 as described above, the calendering direction of the base metal corresponds to a direction connecting the metal-exposed areas 48 situated at both side edges. In a can body obtained by overlapping and welding the metal-exposed areas 48 to each other, the circumferential direction of the can body therefore corresponds to the calendering direction of the base metal. Since a metal sheet generally tends to stretch along its calendering direction, no cracks occur when flanges are formed at both ends of the can body described above. It is therefore possible to advantageously conduct flanging or the like. When a can end is double seamed to a flange part formed on such a can body as described above, it is possible to prevent the contents in the can from leaking through the flange part after the seaming of the can end because no cracks occur at the flange part.

The second embodiment of the present invention will hereinafter be described by reference to FIGS. 4 through 6.

Figure 4:
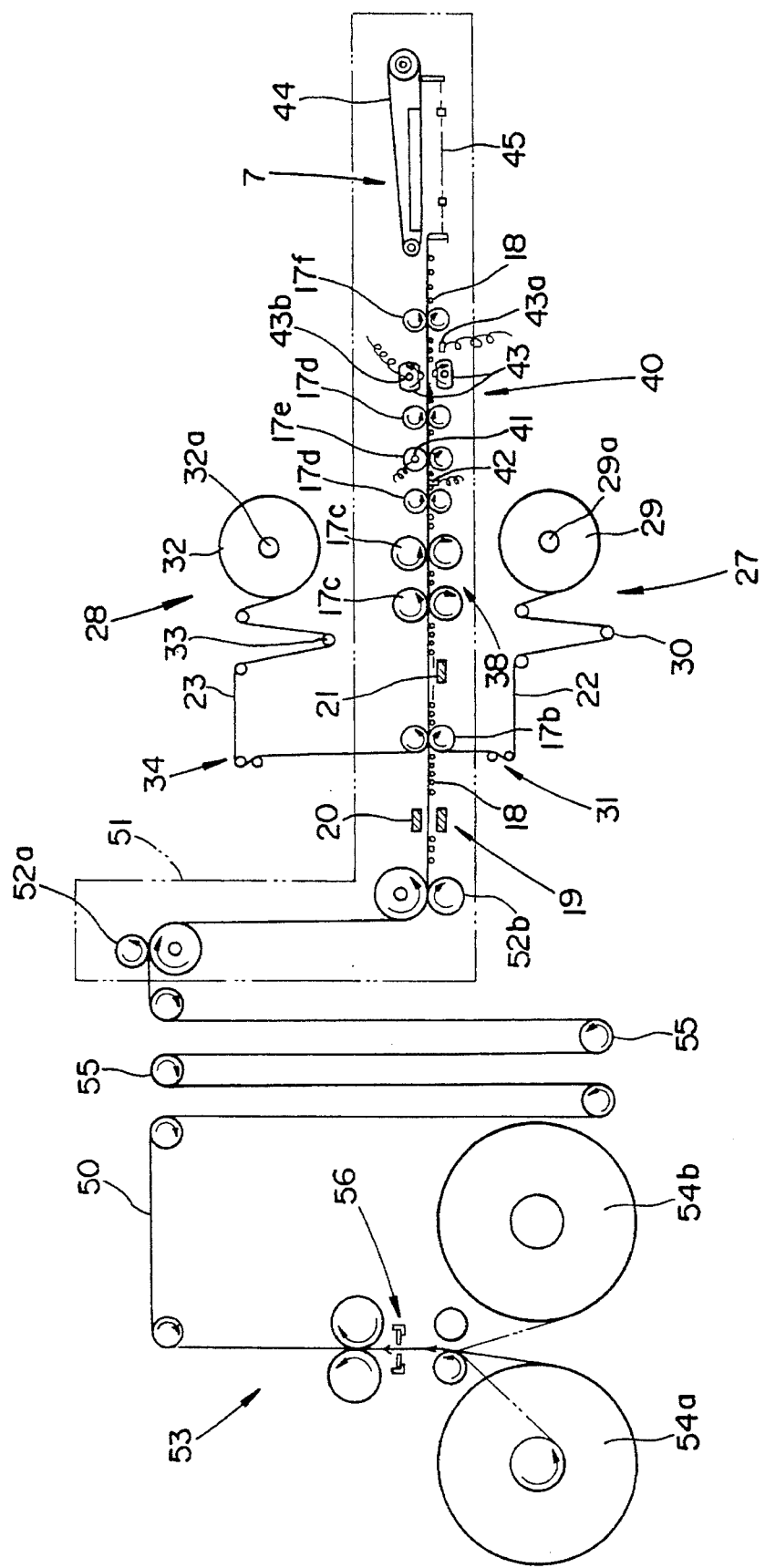
FIG. 4 is a side elevational view illustrating a surface-treating apparatus for can body blanks according to the second embodiment of the present invention.
Figure 5:
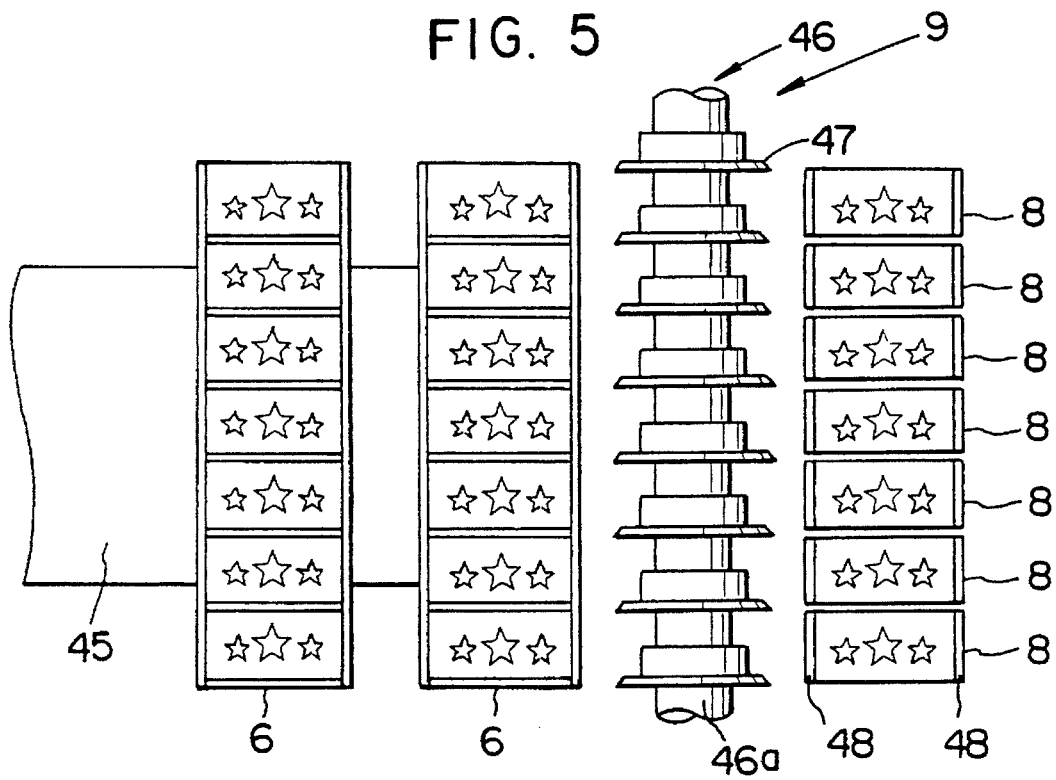
FIG. 5 is a plan view illustrating an important part of the apparatus of FIG. 4.
Figure 6:
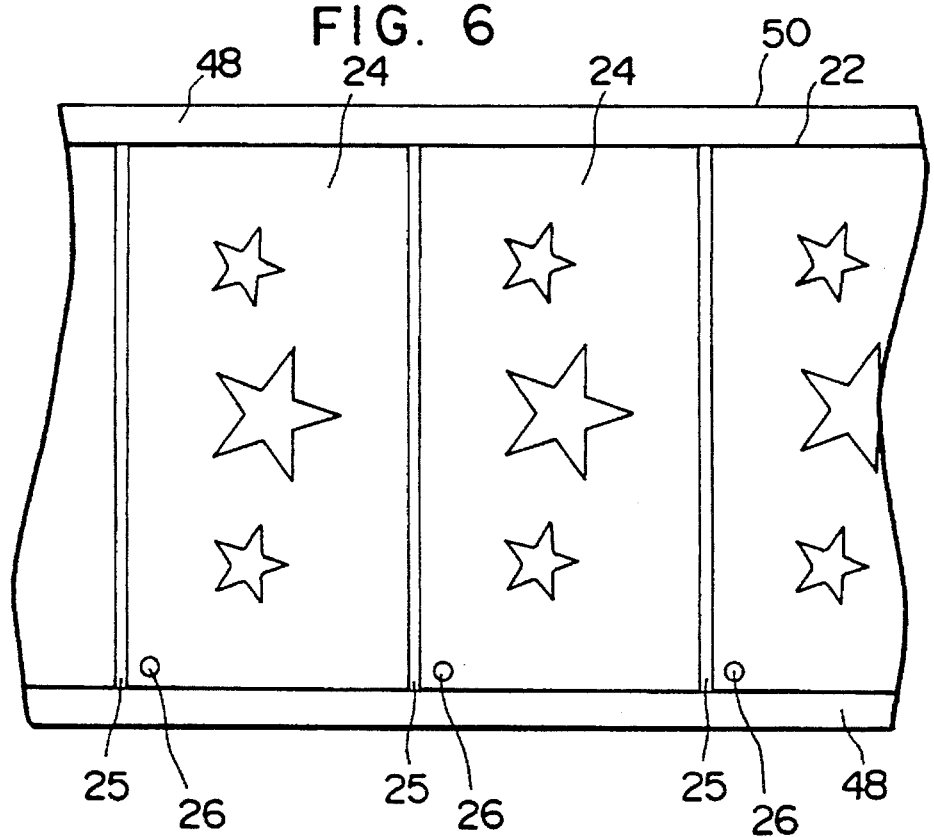
FIG. 6 is a plan view illustrating a can body blank material covered with a polyethylene terephthalate film by the apparatus of FIG. 4.

FIG. 4 is a side elevational view illustrating a surface-treating apparatus for can body blanks according to the second embodiment of the present invention, FIG. 5 is a plan view illustrating the important part of the surface-treating apparatus, and FIG. 6 is a plan view illustrating a can body blank material covered with a polyethylene terephthalate film by the surface-treating apparatus.

Incidentally, since the surface-treating apparatus according to this embodiment includes constituent components common with those in the first embodiment, like reference characters are given to the same components as those in the first embodiment to describe this embodiment.

As illustrated in FIG. 4, the surface-treating apparatus of this embodiment includes a conveying path 51 for conveying a can body blank material 50 in the form of a continuous band in its longitudinal direction. The conveying path 51 includes each pair of feed rolls 52a, 52b, a pair of pressure rolls 17b, each pair of cooling rolls 17c, 17c, each pair of even speed feed rolls 17d, 17e, 17d, and a pair of feed rolls 17f in order from its upstream side, each pair of said rolls being arranged vertically. These rolls 52a, 52b, 17b–17f serve to hold the can body blank material 50 in the form of a continuous band in nips therebetween to convey it. The rolls 17b–17f are of the same construction as that in the first embodiment. As with the first embodiment, a plurality of auxiliary rollers 18 for carrying and conveying the can body blank material 50 are arranged before and/or behind the rolls 17b–17f.

As with the first embodiment, the surface-treating apparatus of this embodiment includes, as a heating means 19 for heating the can body blank material 50 to be conveyed along the conveying path 51, the feed rolls 52b combined with induction heating jacket rolls, and a high-frequency heater 20 and a high-frequency temperature controller 21, which have been arranged respectively before and behind the pressure rolls 17b having a temperature-controlling function (the press-bonding means). The construction of the high-frequency heater 20 and high-frequency temperature controller 21 is the same as that in the first embodiment.

As with the first embodiment, the surface-treating apparatus of this embodiment also includes, as a film-feeding means 27 for feeding a biaxially-stretched polyethylene terephthalate film 22 in continuous form (hereinafter called "film 22" simply), on which predetermined print patterns have been printed, to the pressure rolls 17b, a film coil 29, dancer rolls 30 and an edge controller 31 below the conveying path 51. Similarly, the apparatus includes, as a film-feeding means 28 for feeding a plain polyethylene terephthalate film 23 in continuous form (hereinafter call "film 23" simply) to the pressure rolls 17b, a film coil 32, dancer rolls 33 and an edge controller 34 above the conveying path 51. These construction is the same as that in the first embodiment.

In this case, as illustrated in FIG. 6, print patterns 24 corresponding to the individual blanks 8 for a single can body are successively printed in a row on the film 22 at intervals of a plain area 25 in the longitudinal direction of the film 22. An eye spot 26 which is an identification mark is printed in each print pattern. Both films 22, 23 are formed in such a way that their widths are shorter than the width of the can body blank material 50.

As illustrated in FIG. 4, there is also provided a cutting means 40, which includes the even speed feed rolls 17d, 17d, 17e, a pulse encoder 41, an eye spot sensor 42, knife cylinders 43, a knife-origin sensor 43a and an angular-velocity encoder for knife 43b, at a downstream part of the conveying path 51, like the apparatus shown in FIG. 2 of the first embodiment. This construction is the same as that in the first embodiment. The knife cylinders 43 of the cutting means 40 serve to cut the can body blank material 50 of continuous form with the films 22, 23 respectively press-bonded to both sides thereof.

As with the first embodiment, the surface-treating apparatus of this embodiment further includes a driving-out means 7 for driving a surface-treated can blank material 6 (see FIG. 5), which has been obtained by cutting the can body blank material 50 in continuous form by the cutting means 40, out of the feed rolls 17f provided at a downstream end of the conveying path 51 through a discharge conveyor 44 and a cross-feed conveyor 45 in order, and a dividing means 9 (see FIG. 5) for dividing the surface-treated can body blank material 6 driven out of the conveying path 51 into individual blanks 8 for a single can body by a slitter 46. The construction of these driving-out means 7 and dividing means 9 is the same as that in the first embodiment.

On the other hand, as shown in FIG. 4, the surface-treating apparatus according to this embodiment includes a material-feeding means 53 for feeding the can body blank material 50 in the form of a continuous band to the conveying path 51 on the upstream side of the conveying path 51.

The material-feeding means 53 includes coils 54a, 54b which have been obtained by winding the can body blank material 50 in the form of a continuous band, a plurality of festoon rolls 55 for keeping the tension of the can body blank material 50 in the form of a continuous band, which has been constantly drawn out of the coil 54a or 54b, and serves to feed the can body blank material 50 from one of the coils 54a, 54b to the conveying path 51 through the festoon rolls 55 and the feed rolls 52a. In this case, a spot welder 56 is provided on the upper side between the coils 54a, 54b so as to spot-weld the trailing edge of the can body blank material 50 fed from one coil 54a or 54b to the leading edge of the can body blank material 50 fed from the other coil by the spot welder 56 to join both blank materials to each other where the can body blank material 50 of said one coil runs out.

In this embodiment, the can body blank material 50 is cut in such a size that its width is equal to the length of a blank 8 for a desired can body, and a plurality of can body blanks 8 can be given in a row in the longitudinal direction of the can body blank material 50 and in parallel with each other.

The operation of the surface-treating apparatus according to this embodiment will next be described.

The can body blank material 50 in the form of a continuous band, which has been drawn out of the coil 54a or 54b, is first guided to the feed rolls 52a through a plurality of the festoon rolls 55. At this time, the tension of the can body blank material 50 is kept constant by the festoon rolls 55. The feed rolls 52a hold the can body blank material 50 up and down and feed it to the conveying path 51.

The can body blank material 50 fed to the conveying path 51 is preheated and heated through the feed rolls 52b combined with the induction heating jacket rolls and the high-frequency heater 20, respectively, and then guided to the pressure rolls 17b in the same manner as in the first embodiment.

On the other hand, the films 22, 23 are respectively fed to the pressure rolls 17b by the film-feeding means 27, 28 in the same manner as in the first embodiment. The films 22, 23 are respectively press-bonded under heat to both sides of the can body blank material 50 along its longitudinal direction (conveying direction) by the pressure rolls 17b at a position thereof. At this time, metal-exposed areas, which are used as welding parts, are defined at edge portions of the can body blank material 50 in its longitudinal direction along the respective both side edges of the films 22, 23 as shown in FIG. 6.

In this case, the film 22 is press-bonded with its printed side faced to the can body blank material 50 in the same manner as in the first embodiment. It is also possible to avoid cooling of the heated can body blank material 50 due to its contact with the film 22, 23 and pressure rolls 17b because the pressure rolls 17b have a temperature-controlling function.

The can body blank material 50, to which the films 22, 23 have been press-bonded in the above-described manner, is further heated by the high-frequency temperature controller 21, thereby retaining the adhesion property of the can body blank material 50 to the films 22, 23. Thereafter, the can body blank material 50 is introduced to the cutting process. In the cutting process, eye spots 26 printed on the film 22, which has been press-bonded to the can body blank material 50, are first detected by the eye spot sensor 42 in the same manner as in the first embodiment. On the other hand, the pulse encoder 41 oscillates pulses at certain intervals as the can body blank material 50 is conveyed by the even speed feed rolls 17e. Depending upon how many pulses a cutting control unit (not shown) to which the eye spot sensor 42 and pulse encoder 41 have been connected receives from the pulse encoder 41 by the time it receives the next detection signal on the eye spot after receiving one detection signal, the travel speed of the can body blank material 50 and the timing to cut the can body blank material 50 by the knife cylinders 43 are controlled. In this embodiment, for example, the knife cylinder 43 cuts the can body blank material 50 in the width direction at the plain area 25 of the film 22 whenever the eye spot sensor 42 detects a predetermined number of eye spots 26, for example, 7 eye spots. After this manner, surface-treated can body blank materials 6 in a predetermined length with the films 22, 23 respectively press-bonded to both sides thereof as illustrated in FIG. 5 are provided successively.

Thereafter, the surface-treated can body blank materials 6 are successively driven out of the conveying path 2 by the driving-out means 7 and then divided at the plain areas 25 of the film 22 into individual blanks 8 for a single can body by the dividing means 9 in exactly the same manner as in the first embodiment.

According to the surface-treating apparatus of this embodiment, as described above, it is also possible to obtain efficiently can body blanks 8 like the above-described first embodiment. When the can body blank material 50 with the films 22, 23 press-bonded thereto is cut in particular, the timing to drive the knife cylinders 43 is controlled according to the detection of the eye spot 26 on the film 22, whereby the can body blank material 50 can be accurately cut at the plain area 25 of the film 22. It is therefore possible to assuredly provide a desired number of can body blanks from the surface-treated can body blank material 6 obtained by such cutting.

In the surface-treating apparatus according to this embodiment, the film 22 is press-bonded to the can body blank material 50 in the form of a continuous band. Therefore, it is not necessary to control the positional relation in the longitudinal direction between said can body blank material 50 and the film 22. There is no need to particularly provide such means as the controlled timing to feed the can body blank material 50 and film 22 to the pressure rolls 17b unlike the first embodiment.

Figure 7:
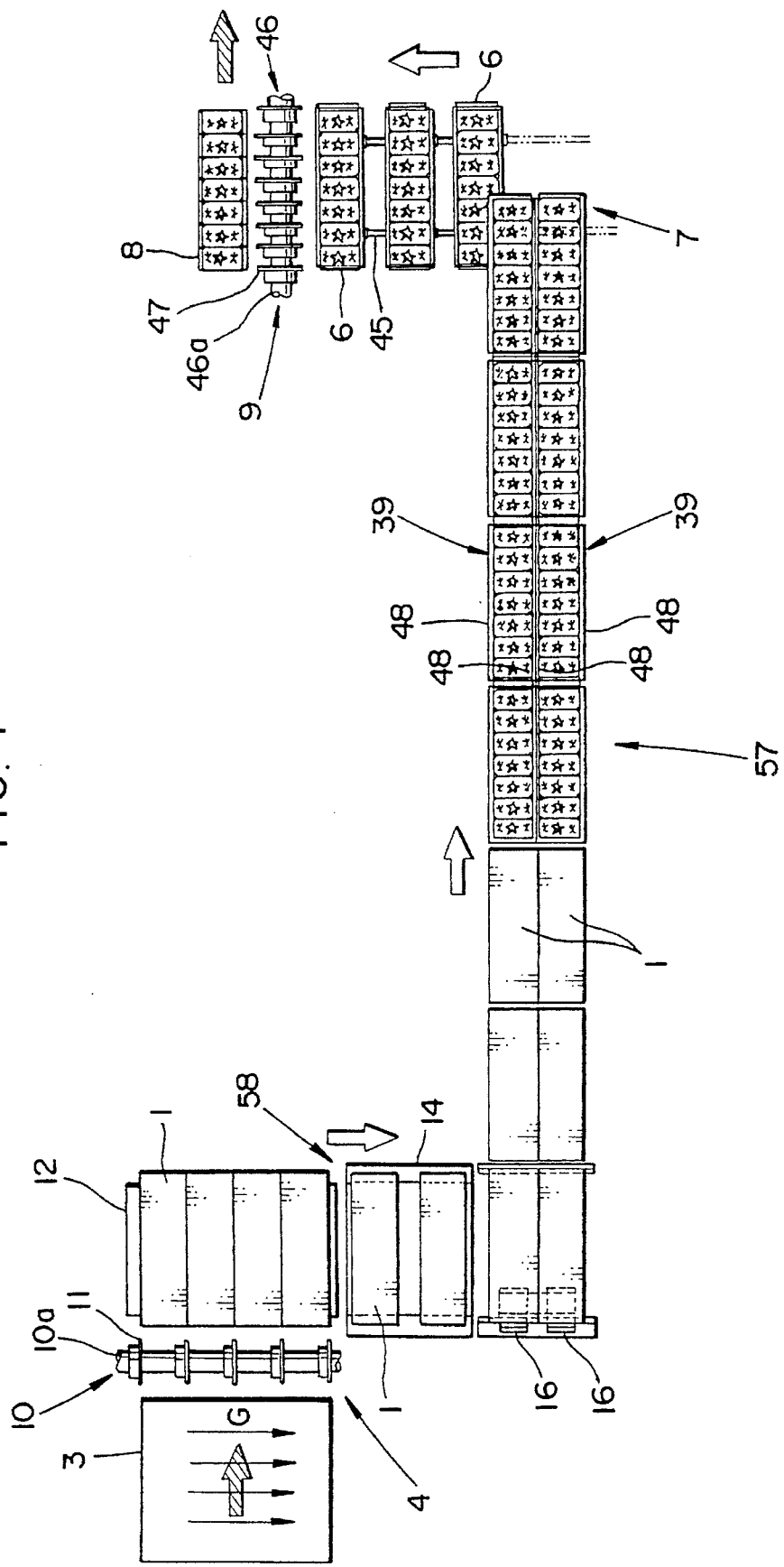
FIG. 7 is a schematic plan view illustrating a surface-treating apparatus for can body blanks according to the third embodiment of the present invention.
Figure 9:
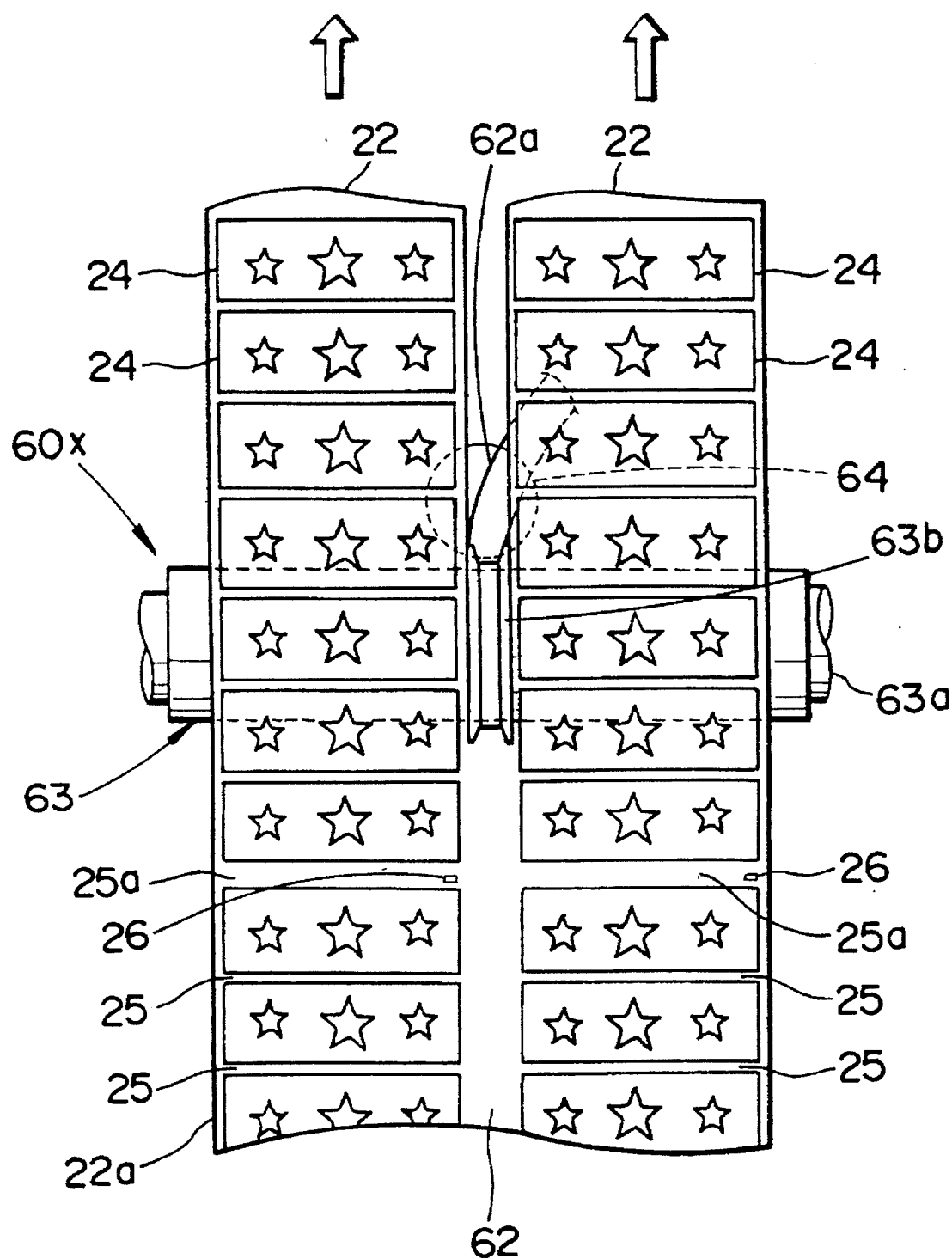
FIG. 9 is a front elevational view illustrating a condition that a biaxially-stretched polyethylene terephthalate film is cut by the apparatus of FIG. 7.
Figure 10:
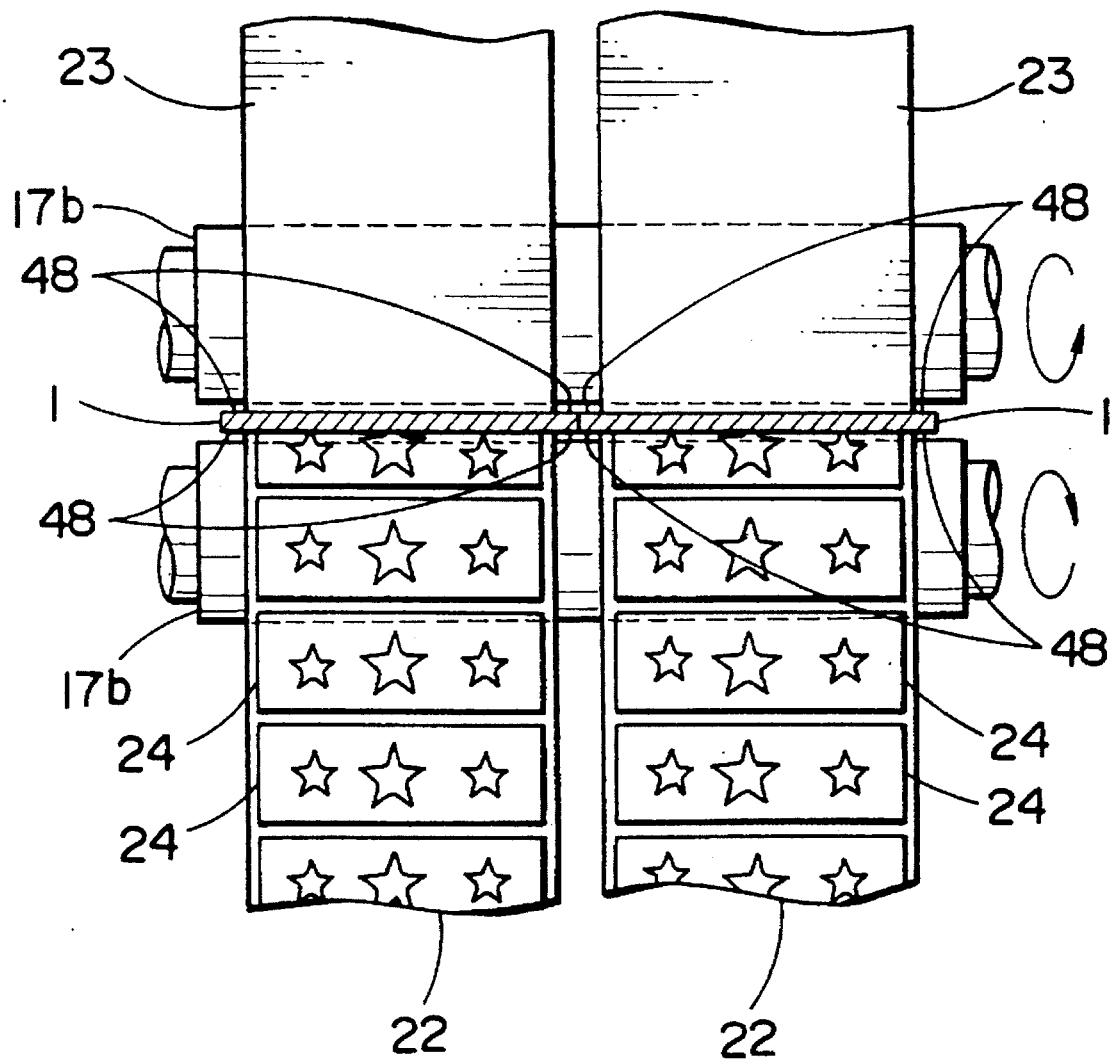
FIG. 10 is a cross-sectional view taken along line X—X of FIG. 8.
Figure 11:
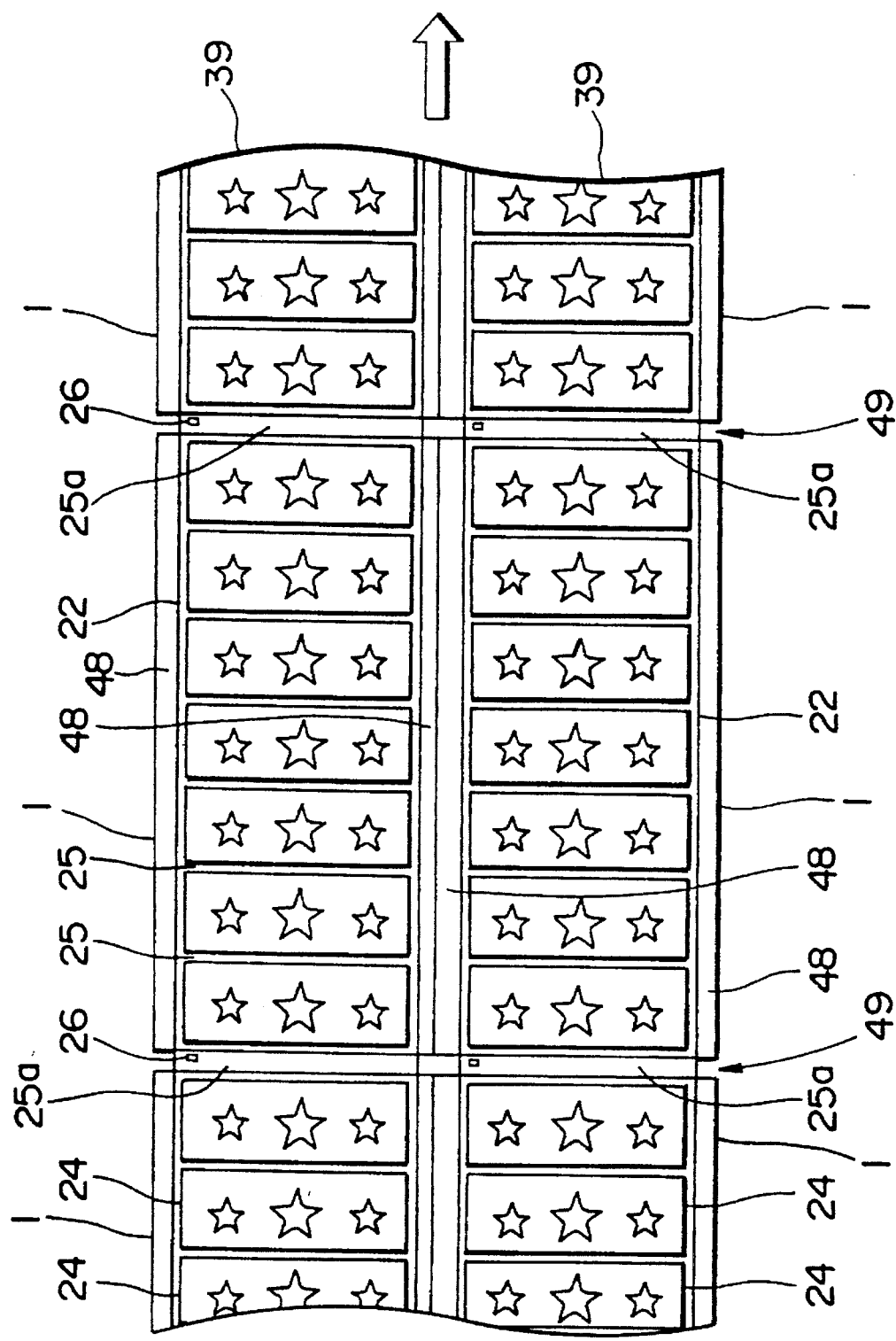
FIG. 11 is a plan view illustrating can body blank materials continuously coupled by the apparatus of FIG. 7.

The third embodiment of the present invention will hereinafter be described by reference to FIGS. 7 through 11. FIG. 7 is a schematic plan view illustrating a surface-treating apparatus for can body blanks according to the third embodiment of the present invention, FIG. 8 is a side elevational view illustrating the surface-treating apparatus, FIG. 9 is a front elevational view illustrating a condition that a printed, biaxially-stretched polyethylene terephthalate film is cut, FIG. 10 is a cross-sectional view taken along line X—X of FIG. 8, and FIG. 11 is a plan view illustrating can body blank materials continuously coupled by the surface-treating apparatus.

Incidentally, since the basic construction of the surface-treating apparatus according to this embodiment is the same as that in the first embodiment, like reference characters are given to the same components as those in the first embodiment in the following description, and their detailed description is omitted.

Figure 8:
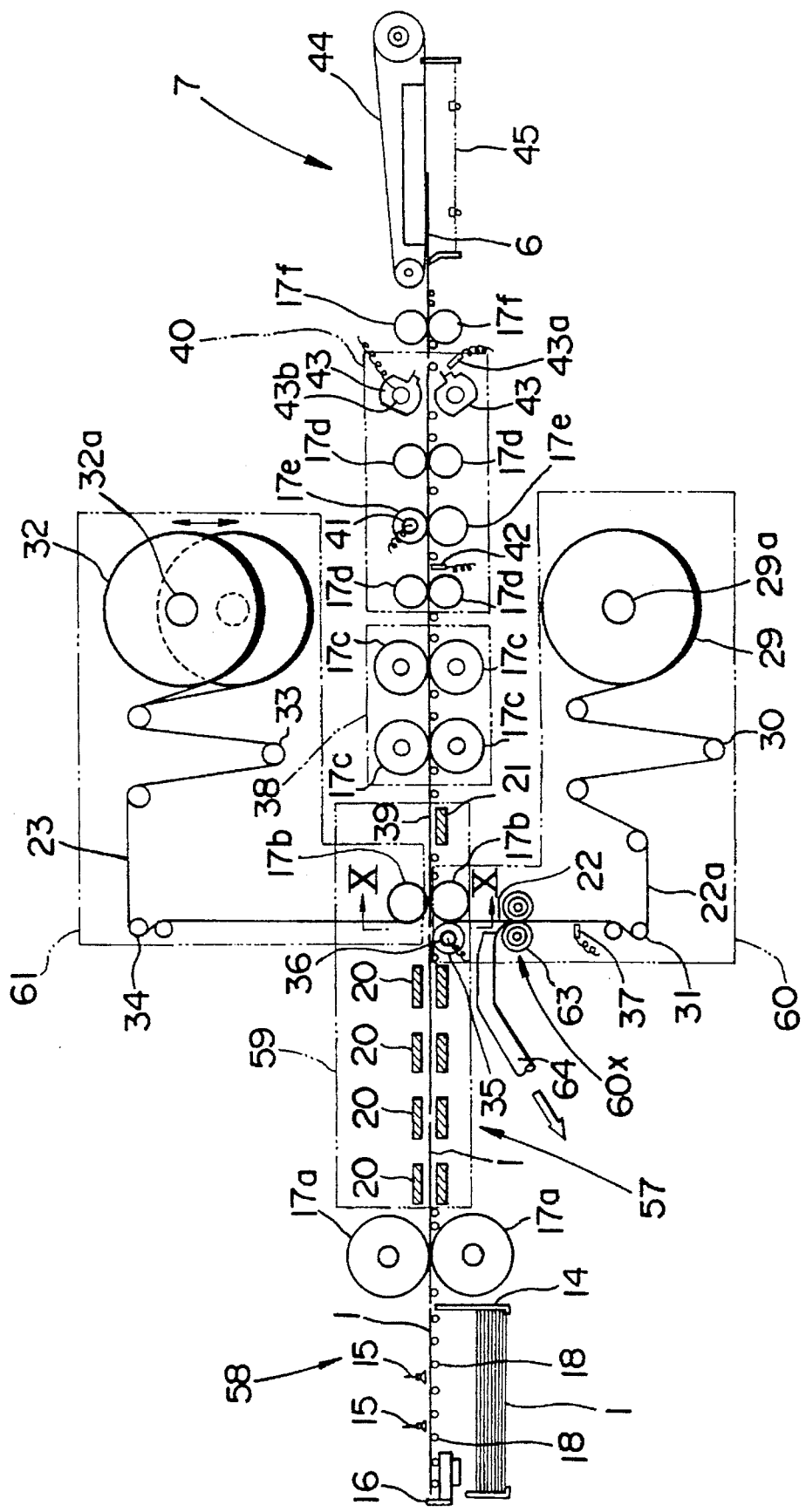
FIG. 8 is a side elevational view illustrating the apparatus of FIG. 7.

Referring now to FIGS. 7 and 8, the outline of the surface-treating apparatus of this embodiment will be described. This apparatus is constructed so as to arrange can body blank materials 1 obtained by cutting an original sheet 1 to give a width corresponding to the length of a single can body blank 8 in two rows to convey them, and then respectively press-bond a printed biaxially-stretched polyethylene terephthalate film 22 (hereinafter called "film 22") and a plain polyethylene terephthalate film 23 (hereinafter call "film 23") to both sides of the can body blank materials 1 in the course of their traveling.

Namely, in FIG. 7, reference character 57 indicates a conveying path along which the can body blank materials 1 obtained by cutting the original sheet 3 are conveyed in two rows and in parallel with each other. On the upstream side of the conveying path 57, there are provided an original sheet-cutting means 4 having the same construction as that in the first embodiment and a material-feeding means 58 for feeding the can body blank materials 1 to the conveying path 57.

On the downstream side of the conveying path 57, there are provided a driving-out means 7 and a dividing means 9, which have the same construction as that in the first embodiment, in that order.

As illustrated in FIG. 8, a heating means 59, respective film-feeding means 60, 61 for feeding the films 22, 23 to the can body blank materials 1, a cooling means 38 and a cutting means 40 are also provided in the course of the conveying path 57. The film-feeding means 60 and 61 are provided respectively below and above the conveying path 57. The construction of the cooling means 38 and the cutting means 40 is the same as that in the first embodiment.

As illustrated in FIGS. 7 and 8, the material-feeding means 58 comprises a cross-feed conveyor 12 for traversing the can body blank materials 1 obtained by the original sheet-cutting means 4 and having a width corresponding to the length of a single can body blank 8 in their width direction, a hopper 14 for temporarily stocking the can body blank materials 1 traversed, suction cups 15 for sucking each of the can body blank materials 1 in the hopper 14 to arrange and transfer them in two rows onto the conveying path 57 and a timing kicker 16 for sending out the can body blank material 1 arranged in two rows to the conveying path 57 at proper timing. In this case, the timing kicker 16 is of the twin type joined at a base. As shown in FIG. 7, the hopper 14 is constructed so as to arrange the can body blank materials 1 in two rows to stock them.

As illustrated in FIG. 8, as with the first embodiment, the conveying path 57 includes each pair of feed rolls 17a–17f, which are arranged vertically, and auxiliary rollers 18 arranged before and/or behind these rolls 17a– 17f. In this case, these rolls 17a–17f are constructed so as to simultaneously hold the can body blank materials 1 arranged in two rows in their nips to convey them. The feed rolls 17b and 17c are combined with pressure rolls and cooling rolls, respectively, as with the first embodiment. The feed rolls 17d and 17e are even speed feed rolls.

The heating means 59 is basically the same as the construction of the heating means in the first embodiment and includes the feed rolls 17a combined with induction heating jacket rolls, a high-frequency heater 20 and a high-frequency temperature controller 21. In this case, a plurality of high-frequency heaters 20 are arranged along the conveying path 57.

The film-feeding means 60 which takes on the feeding of the film 22 includes a coil 29 obtained by winding a biaxially-stretched polyethylene terephthalate film 22a in the form of a continuous band (hereinafter called "film 22a" simply), which is about double the width of the film 22 to be press-bonded to one can body blank material 1, and is constructed so as to feed the film 22a toward the pressure rolls 17b through a plurality of dancer rolls 30 and an edge controller 31, divide the film 22a into two films 22 by a dividing device 60x provided between the edge controller 31 and the pressure rolls 17b and then feed the thus-divided films 22 to the pressure rolls 17b. In this case, the construction of the coil 29, dancer rolls 30 and edge controller 31 is the same as that in the first embodiment.

As illustrated in FIG. 9, print patterns 24 corresponding to the individual blanks 8 for a single can body are successively printed in rows and at intervals of a plain area 25 or 25a in the longitudinal direction of the film 22a on the film 22a wound into the coil 29. These print patterns 24 are printed in two rows in the width direction of the film 22a at an interval of a plain area 62 corresponding to a metal-exposed area 48 for a welding part in a single can body blank 8. An eye spot 26 which is an identification mark is printed on the wider plain area 25a in each print pattern, which is provided at an interval of the predetermined number of the print patterns 24 in each row. This film 22a is cut at the plain area 62 between the rows of the print patterns 24 to divide it into individual rows of the print patterns 24, thereby obtaining two continuous films 22 each having the print patterns 24 arranged in a row.

The dividing device 60x serves to divide the film 22a as described above, and is composed of a trim slitter 63 for cutting the film 22a at the plain area 62 between the rows of the print patterns 24 and cutting off the plain area 62, and a suction duct 64 for discharging the plain area 62 cut off.

As illustrated in FIG. 9, the trim slitter 63 cuts off the plain area 62 by a rotary knife 63b rotatably supported on its support shaft 63a.

As shown in FIG. 8, as with the first embodiment, an eye spot sensor 37 for detecting the eye spots 26 printed on the film 22 (22a) fed to the pressure rolls 17b is provided between the trim slitter 63 and the edge controller 31. As with the first embodiment, an encoder roll 35 equipped with a pulse encoder 36 is further arranged at a position adjacent to the pressure roll 17b. As with the first embodiment, the pulse encoder 36 and the eye spot sensor 37 are connected to a feed control unit (not shown) provided in the material-feeding means 58.

The film-feeding means 61 which takes on the feeding of the plain film 22 is constructed so as to feed the film 23 from a coil 32 obtained by winding the film 23 to the pressure rolls 17b through dancer rolls 33 and an edge controller 34 in that order like the first embodiment. In this case, sets of these coil 32, dancer rolls 33 and edge controller 34 are arranged in two rows in parallel with each other, thereby arranging two continuous films 23 in parallel to feed them to the pressure rolls 17b.

Incidentally, each of the coils 32 is vertically movable according to the tension of the film 23 drawn out.

The operation of the surface-treating apparatus according to this embodiment will next be described.

Referring now to FIG. 7, the original sheet 3 has been rolled in the direction indicated by the arrows G and is fed to the slitter 10 in a direction perpendicular to the calendering direction, thereby cutting it. The can body blank materials 1 obtained by such cutting are conveyed to the hopper 14 through the cross-feed conveyor 12 and temporarily stocked therein in a state that their longitudinal direction is parallel to the conveying path 57. Each of the can body blank materials 1 stocked in the hopper 14 are then sucked by the suction cups 15 provided above the hopper 14 to taken it out of the hopper 14 and then transferred on the auxiliary rollers 18 provided at an upstream end of the conveying path 57. At this time, the can body blank materials 1 are taken out two by two and arranged in two rows in their width direction on the auxiliary rollers 18 in such a manner that their sides parallel to the longitudinal direction come into contact with each other.

The can body blank materials 1 transferred on the auxiliary rollers 18 are successively fed at proper intervals to the feed rolls 17a by the timing kicker 16 and then moved in two rows along the conveying path 57. The timing kicker 16 is operated in such a manner that the can body blank material 1 corresponds to the print patterns 24 printed on the film 22, which will be press-bonded to the can body blank material 1 in the subsequent process, in the same manner as in the first embodiment. The timing kicker 16 is of the twin type and is operated in synchronism according to the movement of the can body blank materials 1 arranged in two rows. Accordingly, the can body blank materials 1 arranged in two rows are fed to the feed rolls 17a in a state that the positions of their leading edges in the longitudinal direction are aligned with each other.

Two can body blank materials 1 arranged in the width direction are then guided to the conveying path 57 by the feed rolls 17a, and first of all, they are heated by the heating means 59 in the same manner as in the first embodiment.

The can body blank material 1 in each row is then guided to the pressure rolls 17b in a heated condition. At this time, the films 22, 23 fed to the pressure rolls 17b are respectively press-bonded under heat to both sides of the can body blank material 1 according to the traveling of the can body blank material 1 in the same manner as in the first embodiment.

At this time, the film 22a, which is a raw material for the films 22, has already been send from the coil 29 to the trim slitter 63 through the dancer rolls 30 and the edge controller 31, and is cut along the longitudinal direction by the trim slitter 63 at the plain area 62 in the width direction as illustrated in FIG. 9, whereby the film 22a is divided into two films 22, on which the print patterns 24 and the eye spots 26 have been arranged in a row in the longitudinal direction, and the cut-off portion 62a corresponding to the plain area 62 in the width direction. The cut-off portion 62a is sucked in an opening of the suction duct 64 provided in contact with the trim slitter 63 and on the downstream side thereof to discharge and remove it. The films 22 obtained by dividing the film 22a are narrower in width than the length of a single can body blank 8 because the cut-off portion 62a is removed. The films 22 are fed to their corresponding can body blank materials 1, which are traveling in rows in the conveying direction of the conveying path 57 in a state aligned with each other in the width direction, and then press-bonded to the can body blank materials 1 in the respective rows by the pressure rolls 17b.

Referring to FIG. 8, the plain films 23 are-drawn out of two coils 32, which have been provided according to the number of rows of the can body blank materials 1 arranged in two rows in alignment with each other in the width direction, and fed to their corresponding can body blank materials 1, which are traveling along the conveying path 57, through the respective dancer rolls 33 and edge controllers 34. The film 23 in each row is then press-bonded to the can body blank material 1 by the pressure rolls 17b so as to correspond to the film 22.

As illustrated in FIG. 10, the films 22, 23 fed to the can body blank material 1 in each row in the above-described manner are simultaneously press-bonded under heat to different sides of the can body blank material 1. At this time, the films 22, 23 are positioned in the width direction of the can body blank material 1 through the respective edge controllers 31, 34, thereby defining metal-exposed areas 1a, which are used as welding parts, at edge portions of the can body blank material 1 along respective both side edges of the films 22, 23.

By the above-described press-bonding, as with the first embodiment, the can body blank materials 1 are coupled in a continuous form by the continuous films 22, 23 in each row, thereby forming a continuous sheet 39 of the can body blank materials 1.

Since the film 22 press-bonded to the can body blank materials in each row is obtained by dividing the original film 22a in the course of the feeding to the pressure rolls 17b, the print patterns 24 printed on the individual films 22 maintain the same positional relation as that prior to the division under the control of a film part 22a before division. On the other hand, the can body blank materials 1 arranged in two rows are traveling on the conveying path 57 in a state that the positions of their leading edges in the longitudinal direction are aligned with each other. Therefore, the printed patterns on the films 22 obtained by the division mutually maintain the same positional relation as that before the division even after the films 22 are press-bonded to the respective can body blank materials 1. Accordingly, in the continuous sheets 39 of the can body blank materials 1 arranged in rows, the positions of the print patterns 24 on the films 22 press-bonded to the can body blank materials 1 are aligned with each other between the individual can body blank materials 1 which have been arranged in rows with their sides parallel to the longitudinal direction coming into contact with each other, as illustrated in FIG. 11.

Incidentally, although the films 22 are practically press-bonded on the lower side of the can body blank materials 1, the drawings in FIGS. 7 and 11 illustrate the can body blank materials 1 with the side on which the films 22 have been press-bonded upside for convenience of illustration.

In this embodiment, as with the first embodiment, the timing to operate the timing kicker 16 in the material-feeding means 58 is controlled using detection signals of the eye spot sensor 37 and pulse signals of the pulse encoder 36. Accordingly, as illustrated in FIG. 11, the films 22 are press-bonded to the can body blank materials 1 in such a manner that the position of the plain area 25a of each film 22 corresponds to the position of the joint 49 between the can body blank materials 1 and the print pattern 24 does not extend to the joint 49.

In this case, the timing kicker 16 of the twin type is operated in synchronism according to the movement of the can body blank materials 1 arranged in two rows. Accordingly, the films 22, 23 are press-bonded to the can body blank materials of the individual rows with their original condition arranged in parallel with each other kept unchanged.

Thereafter, each of the continuous sheets 39 of the can body blank materials 1 is cooled by the cooling means 38 in the same manner as in the first embodiment and then cut by the knife cylinders 43 of the cutting means 40.

In this case, the knife cylinders 43 of the cutting means 40 are operated under control of a cutting control unit (not illustrated), to which the pulse encoder 41, eye spot sensor 42, knife cylinder 43, knife-origin sensor 43a and angular-velocity sensor for knife 43b have been connected, so as to accurately cut the continuous sheet 39 of the can body blank materials 1 at a position of its joint 49 in the same manner as in the first embodiment.

Namely, the even speed feed rolls 17d and 17e are rotated at an even speed in synchronism with each other to convey the continuous sheet 39 at a predetermined rate. The pulse encoder 41 oscillates a pulse at certain intervals whenever the continuous sheet 39 is sent out.

According to the cutting control means of this embodiment, when a predetermined eye spot 26 printed on the film 22 on the continuous sheet 39 is first detected by the eye spot sensor 42, its detection signal is sent to the cutting control unit. When the cutting control unit receives the detection signal on the eye spot 26 from the eye spot sensor 42, it starts counting the number of pulses oscillated by the pulse encoder 41, thereby calculating the traveled distance of the continuous sheet 39 from the number of pulses.

When the number of pulses oscillated reaches a predetermined number after the cutting control unit receives the detection signal on the eye spot 26, the cutting control unit judges according to the data inputted in advance that a distance until a joint 49 of the continuous sheet 39 arrives at a cutting position has corresponded to a distance until the knife cylinders 43 are rotated and their knives arrive at the cutting position, and hence outputs a start command to the knife cylinders 43.

The knife cylinders 43 generally wait at positions where their knives do not come into contact with the continuous sheet 39 being conveyed along the conveying path 57, and start rotating or accelerate the rotation according to the data inputted in advance when the start command is received. At this time, the angular velocity of the knives attached to the knife cylinders 43 is measured by the angular-velocity encoder for knife 43b and inputted into the cutting control unit. The cutting control unit compares the angular velocity with the data inputted in advance. When the angular velocity of the knives is not appropriate, the cutting control unit corrects it by outputting a correction command to the knife cylinder 43.

The continuous sheet 39, which is being conveyed at a predetermined speed by the even speed rolls 17d and 17e, is cut by the knives attached to the knife cylinders 43 at a positions of its joint 49.

The knife cylinders 43 continues to rotate until the knife-origin sensor 43a detects the knife attached to the knife cylinder 43 even after cutting the continuous sheet 39 at the position of the joint 49. The knife-origin sensor 43a detects the knife and then outputs a detection signal into the cutting control unit. As a result, the cutting control unit judges that the knife attached to each of the knife cylinders 43 has arrived at a position where it does not come into contact with the continuous sheet 39 and the knife cylinders 43 have returned to the waiting position, and hence stops or decelerates the rotation of the knife cylinders 43. If the length of the can body blank material 1 to be cut out from the continuous sheet 39 is short, the knife cylinders 43 may be continuously run only by accelerating and decelerating their rotation without starting and stopping the rotation at every cutting.

According to the cutting process as described above, the continuous sheets 39 of two rows are simultaneously cut at their joints 49 to provide two surface-treated can body blank materials 6 with the films 22, 23 respectively press-bonded to both sides of the can body blank materials 1 at the same time, each of said surface-treated can body blank materials 6 corresponding to one can body blank material 1. A predetermined number of the print patterns 24 are accurately printed on the film 22 of each of the surface-treated can body blank materials 6 thus obtained.

The surface-treated can body blank materials 6 obtained from each row of the can body blank materials 1 in the above-described manner are successively driven out of the conveying path 57 by the driving-out means 7 and divided into individual blanks 8 for a single can body in exactly the same manner as in the first embodiment.

According to the surface-treating apparatus of this embodiment, as described above, it is possible to obtain a great number of can body blanks 8 in a short period of time, whereby the production efficiency of the can body blank materials 6 can be enhanced.

In this case, the can body blank materials 1 conveyed on the conveying path 57 in two rows and in parallel with each other are conveyed in accurate alignment with each other in their width direction, so that they can be subjected to the same treatment at the same time. It is therefore possible to obtain a great number of can body blanks 8 with extremely high efficiency, and moreover to simplify the construction of various treating devices such as the cutting means 40.

Incidentally, although the can body blank materials 1 have been arranged in two rows in alignment with each other in this embodiment, they may be arranged in a greater number of rows. In such a case, the film 22a has a width corresponding to the number of rows of the can body blank materials 1, and the print patterns 24 of the same rows as those of the can body blank materials 1 are printed in the width direction of the film 22a. The plain films 23 of the same number as the print patterns 24 printed in the width direction of the film 22a are fed in parallel with each other.

Figure 12:
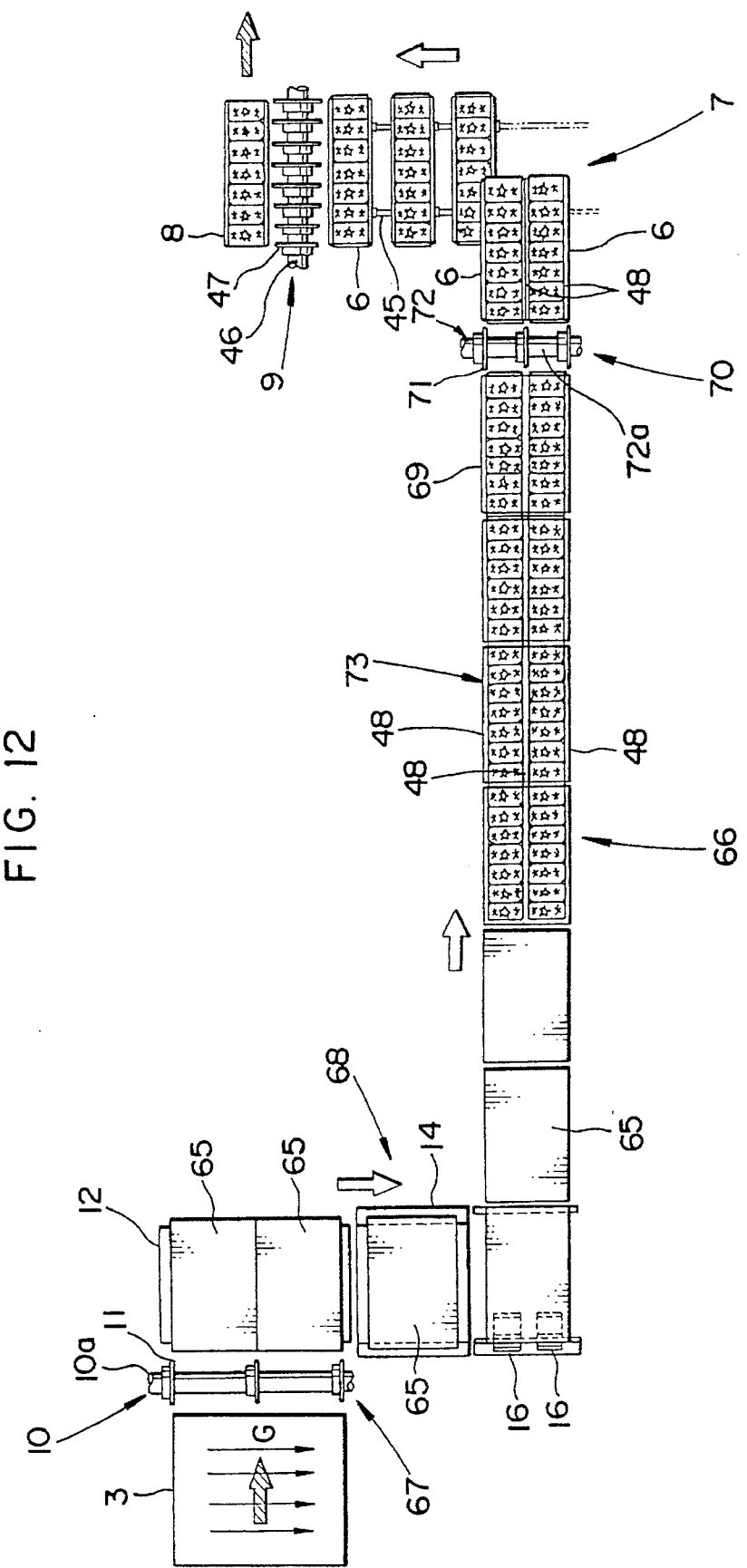
FIG. 12 is a schematic plan view illustrating a surface-treating apparatus for can body blanks according to the fourth embodiment of the present invention.

The fourth embodiment of the present invention will hereinafter be described by reference to FIGS. 12 through 14. FIG. 12 is a schematic plan view illustrating a surface-treating apparatus for can body blanks according to the fourth embodiment of the present invention, FIG. 13 is a side elevational view illustrating the surface-treating apparatus, and FIG. 14 is a plan view illustrating can body blank materials continuously coupled by the surface-treating apparatus.

Incidentally, since the basic construction of the surface-treating apparatus according to this embodiment is the same as that in the first and third embodiments, like reference characters are given to the same components as those in the first and third embodiments in the following description, and their detailed description is omitted.

Figure 14:
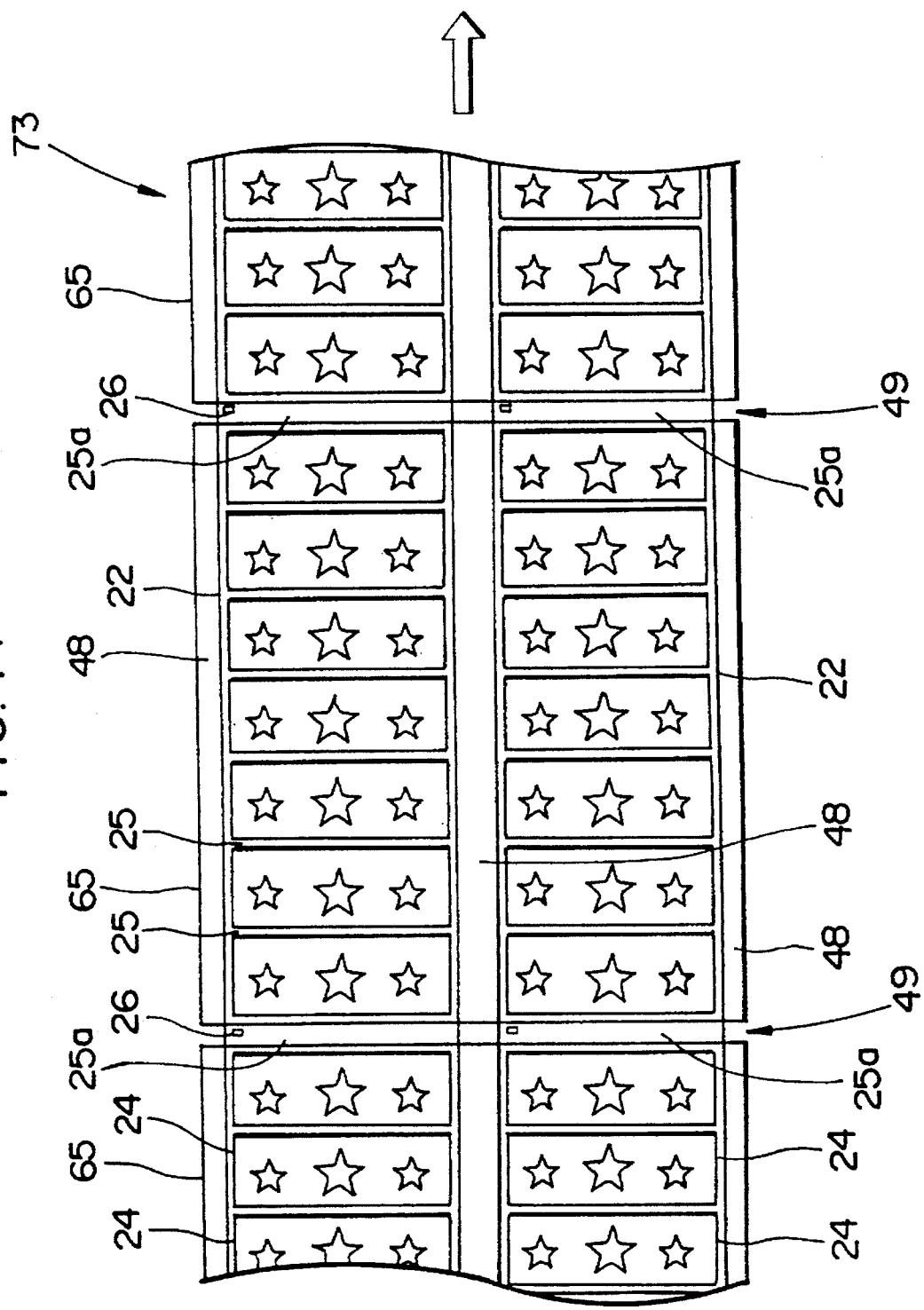
FIG. 14 is a plan view illustrating can body blank materials continuously coupled by the apparatus of FIG. 12.

As illustrated in FIGS. 12 and 14, the surface-treating apparatus of this embodiment includes a conveying path 66 for conveying can body blank materials 65 obtained by cutting so as to have a width corresponding to the length of two blanks for a single can body (a width corresponding to two sheets of the above-described can body blank material 1), and is provided with an original sheet-cutting means 67 and a material-feeding means 68 on the upstream side of the conveying path 66. On the downstream side of the conveying path 66, there is provided a dividing means 70 for dividing a surface-treated can body blank material 69, which is obtained by respectively press-bonding a printed biaxially-stretched polyethylene terephthalate film 22 (hereinafter called "film 22") and a plain polyethylene terephthalate film 23 (hereinafter call "film 23") to both sides of the can body blank material 65 as will be described subsequently, into individual surface-treated can body blank materials 6 having a width corresponding to the length of a blank 8 for a single can body. In addition, a driving-out means 7 and a dividing means 9, which have the same construction as that in the third embodiment, are connected to the dividing means 70. Finally, individual blanks 8 for a single can body are provided by the dividing means 9.

Figure 13:
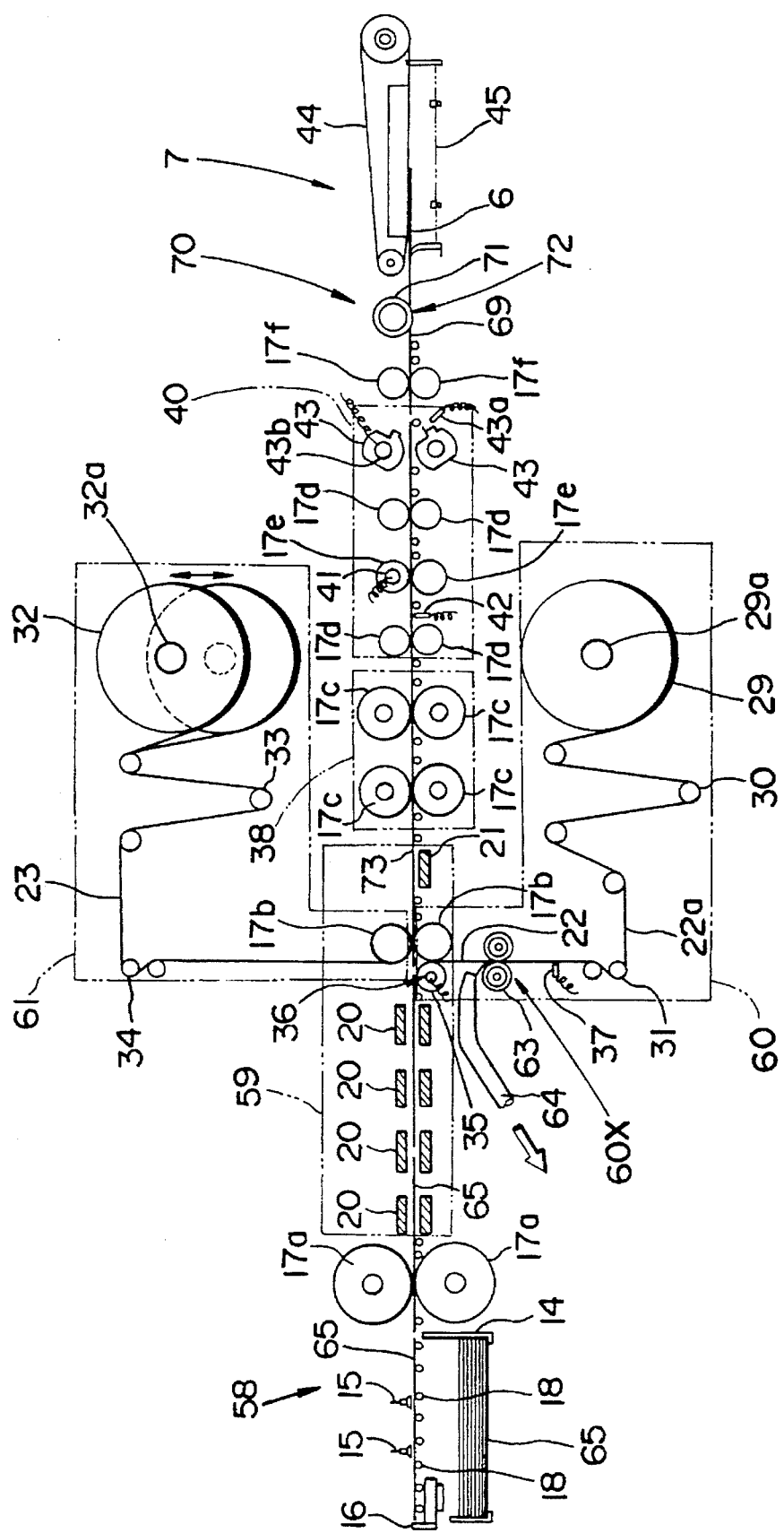
FIG. 13 is a side elevational view illustrating the apparatus of FIG. 12.

As shown in FIG. 13, a heating means 59, film-feeding means 60, 61, a cooling means 38 and a cutting means 40, which have the same construction as that in the third embodiment, are also provided in the course of the conveying path 66.

The basic construction of the original sheet-cutting means 67 and the material-feeding means 68 is the same as that in the third embodiment. The original sheet-cutting means 67 cuts an original sheet 3 into widths sufficient for the length of two blanks for a single can body by a slitter 10 having 3 rotary knives 11. Accordingly, the can body blank material 65 obtained by this cutting can not only provide a plurality of can body blanks 8 in its longitudinal direction, but also provide a plurality of can body blanks 8 in its width direction.

The material-feeding means 68 is constructed so as to feed the can body blank material 65 one by one to the conveying path through the cross-feed conveyor 12, hopper 14, suction cups 15 and a timing kicker 16 of the twin type.

As illustrated in FIGS. 12 and 13, the dividing means 70 provided on the downstream side of the conveying path 66 is composed of a slitter 72 which is arranged on the downstream side of feed rolls 17f and rotatably supports a plurality of rotary knives 71 at predetermined intervals on its support shaft 72a. The plurality of rotary knives 71 are supported on the support shaft 72a so as to adjust their intervals to the length of a blank 8 for a single can body.

The operation of the surface-treating apparatus according to this embodiment will next be described.

Referring now to FIG. 12, the original sheet 3 is first cut by the slitter 10 into can body blanks 65. Each of the can body blank materials 65 has such a size that 14 sheets (twice the number of can body blanks 8 obtained from the can body blank material 1) of the blank 8 for a single can body can be finally provided therefrom.

The can body blank materials 65 obtained in such a manner are temporarily stocked in the hopper 14 by the material-feeding means 68 in the same manner as in the third embodiment, and then transferred one by one by the suction cups 15 on the auxiliary rollers 18 provided at an upstream end of the conveying path 66.

The can body blank materials 65 transferred on the auxiliary rollers 18 are sent out one by one to the conveying path 66 by the timing kicker 16 in the same manner as in the third embodiment and conveyed in a row on the conveying path 66.

Two printed films 22 obtained by dividing a film 22a in the same manner as in the third embodiment and two plain films 23 are respectively continuously press-bonded to both sides of the can body blank materials 65 along the conveying direction thereof.

As a result, the can body blank materials 65 are held between the continuous films 22 and 23 to form a continuous sheet 73 obtained by coupling the can body blank material 65 in a continuous form as shown in FIG. 14. In this continuous sheet 73, films 22 and 23 are respectively press-bonded two by two in its longitudinal direction, and metal-exposed areas 48, which are used as welding parts, are defined at edge portions of the can body blank material 65 along respective both side edges of the films 22, 23. Incidentally, a metal-exposed area 48 between the films 22, 22 (or films 23, 23) has a width which is twice the width of the metal-exposed area 48 defined at either edge of the blank material 65.

Since two films 22 press-bonded to the can body blank material 65 are obtained by dividing the original film 22a in the course of the feeding to the pressure rolls 17b, the print patterns printed on the individual films 22 maintain the same positional relation as that prior to the division under the control of a film part 22a before division. On the other hand, the can body blank material 65 is a single material. Therefore, the printed patterns 24 on the films 22 obtained by the division maintain the same positional relation as that before the division even after the films 22 are press-bonded to the can body blank material 65. Accordingly, in the continuous sheet 73 of the can body blank materials 65, the positions of the print patterns 24 on the films 22 are aligned with each other in the width direction of the continuous sheet 73. Therefore, there is no potential problem that positions of the print patterns 24 are different from each other before and behind in the width direction of the can body blank material 65 after coupling the can body blank materials 65 in a continuous form.

Incidentally, although the films 22 are practically press-bonded on the lower side of the can body blank materials 65, the drawings in FIGS. 12 and 14 illustrate the can body blank materials 65 with the side on which the films 22 have been press-bonded upside for convenience of illustration.

In this embodiment, as with the first and third embodiments, the films 22 are press-bonded to the can body blank materials 65 in such a manner that the position of the plain area 25a of each film 22 corresponds to the position of the joint 49 between the can body blank materials 65 and the print pattern 24 does not extend to the joint 49. Such press-bonding is performed by controlling the timing to feed the can body blank materials 65 to the conveying path 66 in the same manner as in the first and third embodiments.

Thereafter, the continuous sheet 73 of the can body blank materials 65 is guided to the cooling means 38 and the cutting means 40 in that order to cut it at a position of its joint 49 in the same manner as in the third embodiment, thereby obtaining surface-treated can body blank materials 69 with the films 22, 23 respectively press-bonded to both sides of the can body blank materials 65.

Since the width of the surface-treated can body blank materials 69 thus obtained is yet twice the length of a blank 8 for a single can body, they are then guided to the dividing means 70 in the surface-treating apparatus of this embodiment. In the dividing means 70, each of the surface-treated can body blank materials 69 is cut and divided by the slitter 72 at the metal-exposed area 48 between two films 22 and 22 into can body blank materials having a width corresponding to the length of the blank 8 for a single can body, thereby obtaining two sheets of the same surface-treated can body blank materials 6 as those in the first and second embodiments at the same time.

In the surface-treated can body blank material 6, metal-exposed areas are defined at edge portions of the can body blank material 6 along respective both side edges of the films 22, 23.

Thereafter, each of the surface-treated can body blank materials 6 is divided into individual blanks 8 for a single can body through the driving-out means 7 and the dividing means 9 in that order in exactly the same manner as in the first and third embodiments.

According to the surface-treating apparatus of this embodiment, as described above, it is possible to obtain a great number of can body blanks 8 in a short period of time like the third embodiment. Therefore, the production efficiency of the can body blank materials 6 can be enhanced. In this case, two films 22 press-bonded to the can body blank material 65 are accurately aligned in the width direction of the can body blank material 65 with respect to the position of the print patterns 24 printed thereon, so that surface-treated can body blank materials 6 equal to each other can be obtained with ease. It is therefore possible to obtain a great number of can body blanks 8 with extremely high efficiency.

Although the width of the can body blank material 65 has been preset so as to have a width twice the length of a single can body blank 8, its width may be preset so as to have a width capable of dividing into a greater number of the can body blanks 8. At this time, the film 22a has a width corresponding to the width of the can body blank material 65, and on the surface thereof, the print patterns 24 of the same number as the dividing number of the can body blank material 65 are printed in its width direction. On the other hand, the plain films 23 of the same number as the number of the print patterns printed in the width direction of the film 22a are fed in parallel with each other.

Figure 15:
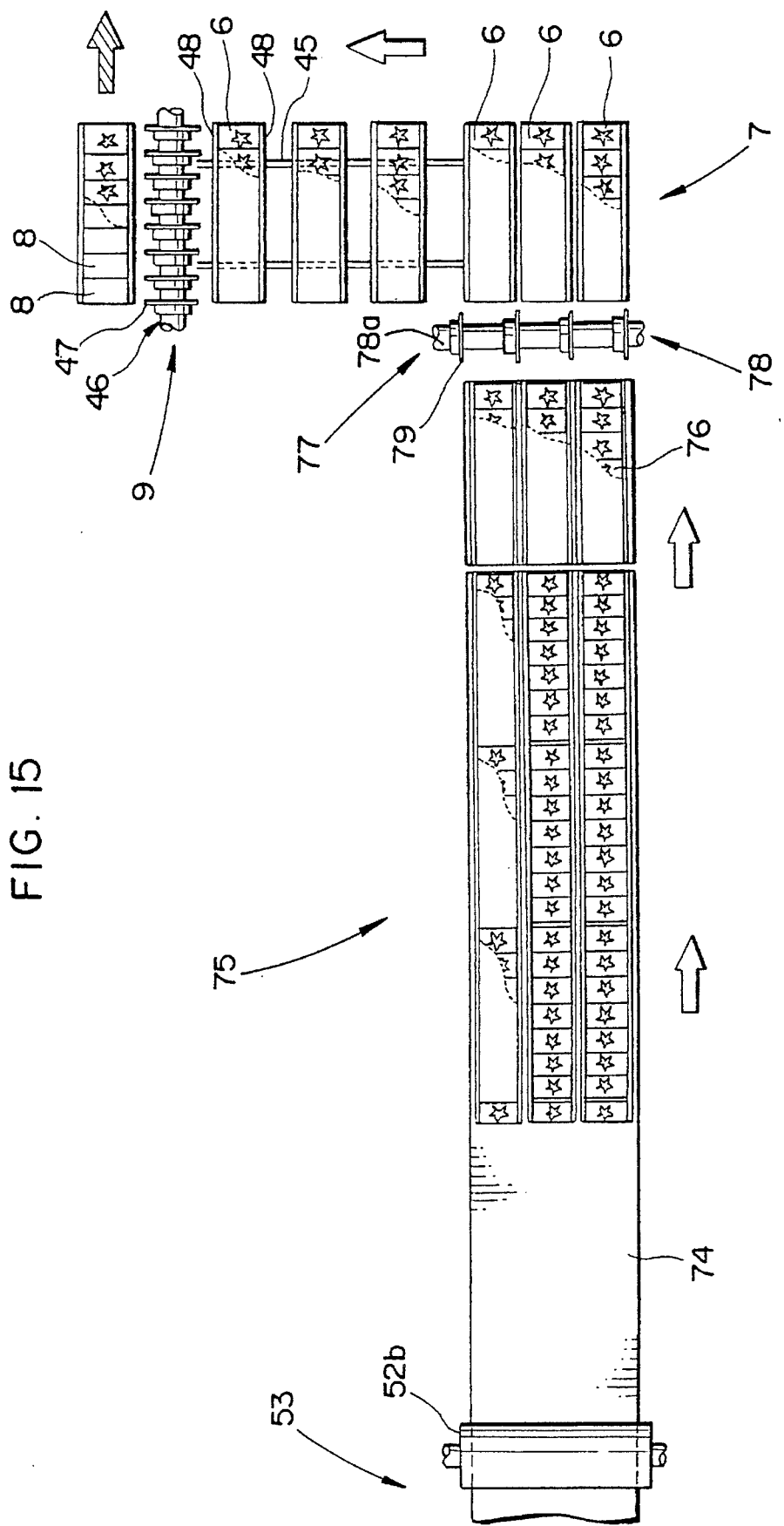
FIG. 15 is a schematic plan view illustrating a surface-treating apparatus for can body blanks according to the fifth embodiment of the present invention.
Figure 17:
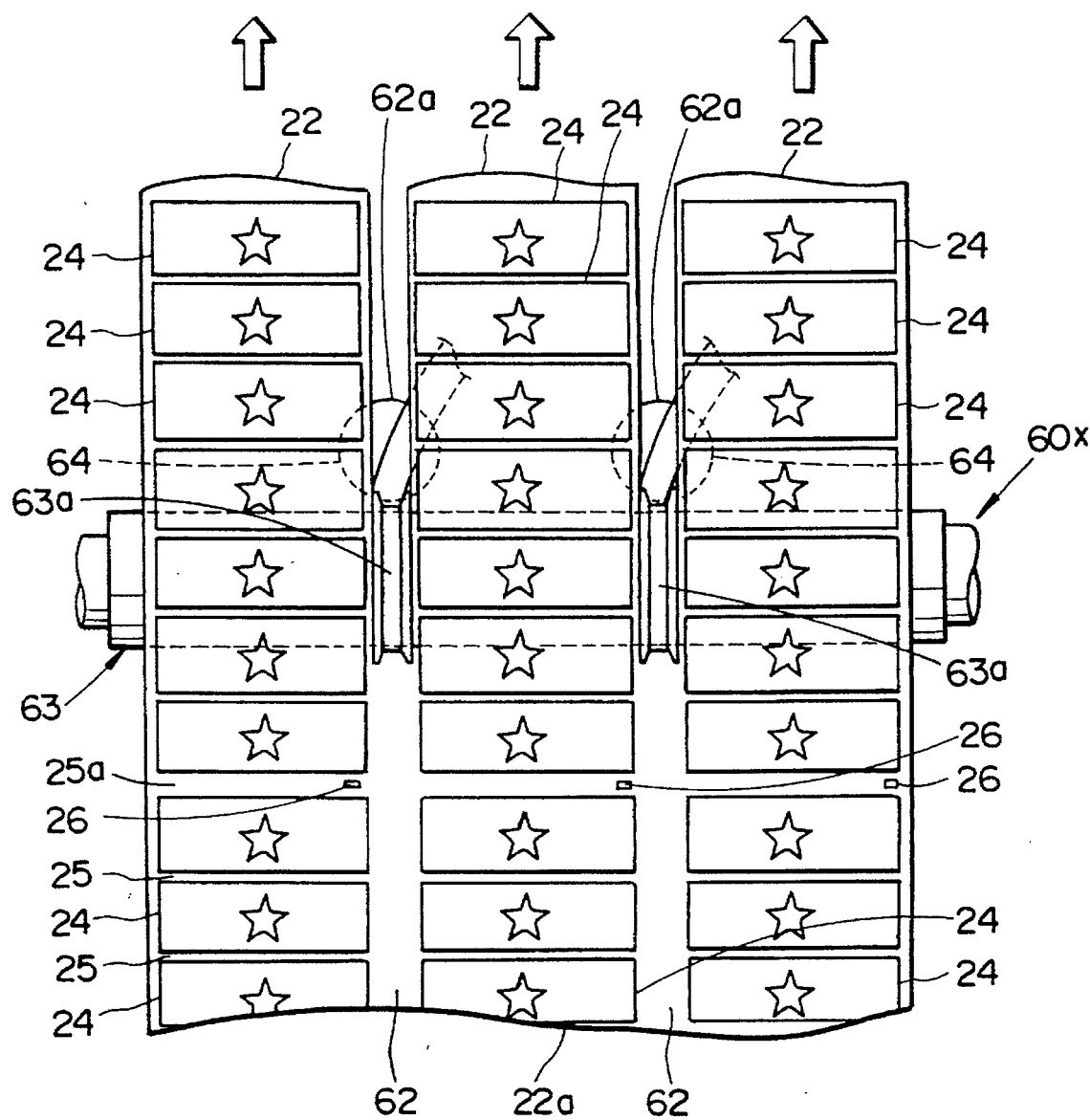
FIG. 17 is a front elevational view illustrating a condition that a biaxially-stretched polyethylene terephthalate film is cut by the apparatus of FIG. 15.
Figure 18:
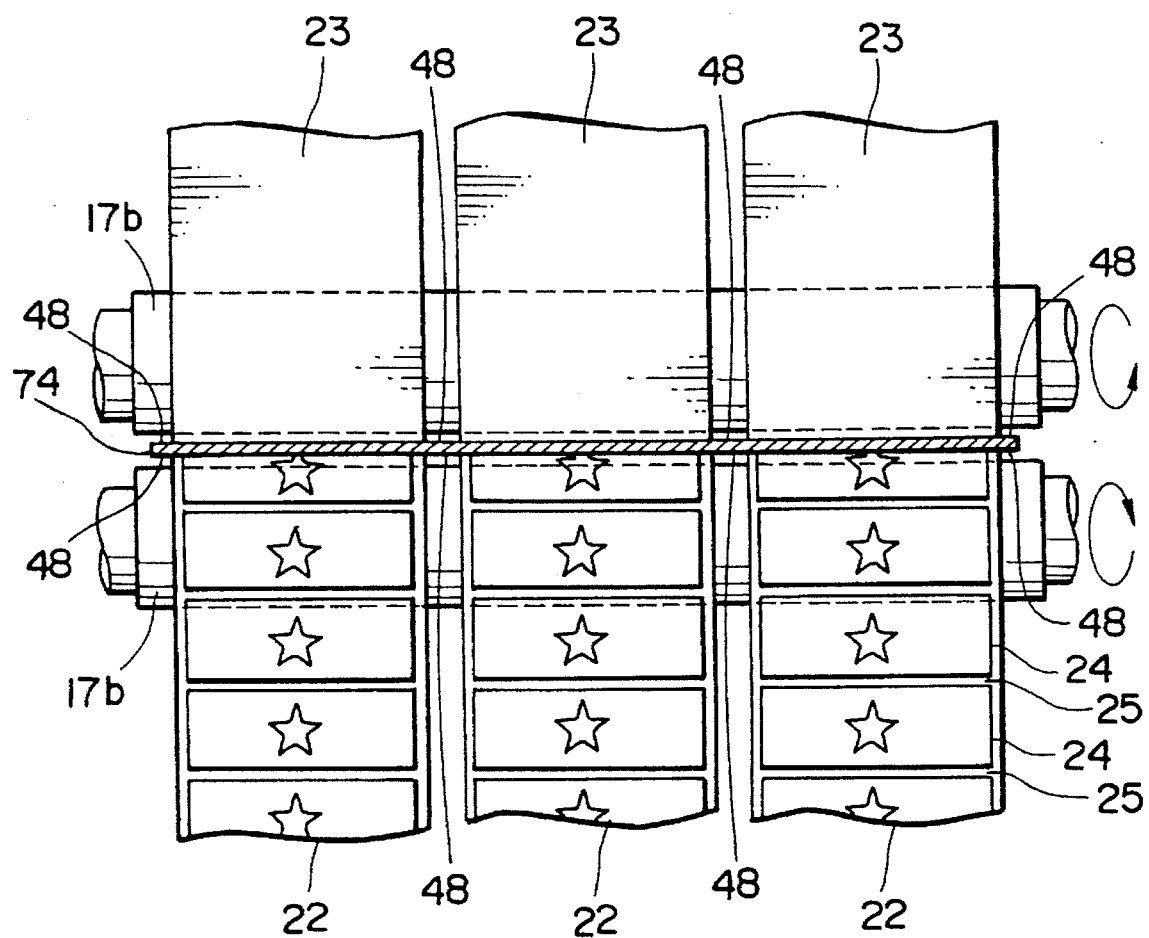
FIG. 18 is a cross-sectional view taken along line XVIII—XVIII of FIG. 16.

The fifth embodiment of the present invention will hereinafter be described by reference to FIGS. 15 through 19. FIG. 15 is a schematic plan view illustrating a surface-treating apparatus for can body blanks according to the fifth embodiment of the present invention, FIG. 16 is a side elevational view illustrating the surface-treating apparatus, FIG. 17 is a front elevational view illustrating a condition that a printed, biaxially-stretched polyethylene terephthalate film is cut, FIG. 18 is a cross-sectional view taken along line XVIII—XVIII of FIG. 16, and FIG. 19 is a plan view illustrating a can body blank material to which the biaxially-stretched polyethylene slit films have been bonded.

Incidentally, since the basic construction of the surface-treating apparatus according to this embodiment is the same as that in the aforesaid embodiments, like reference characters are given to the same components as those in the aforesaid embodiments, and their detailed description is omitted.

Figure 16:
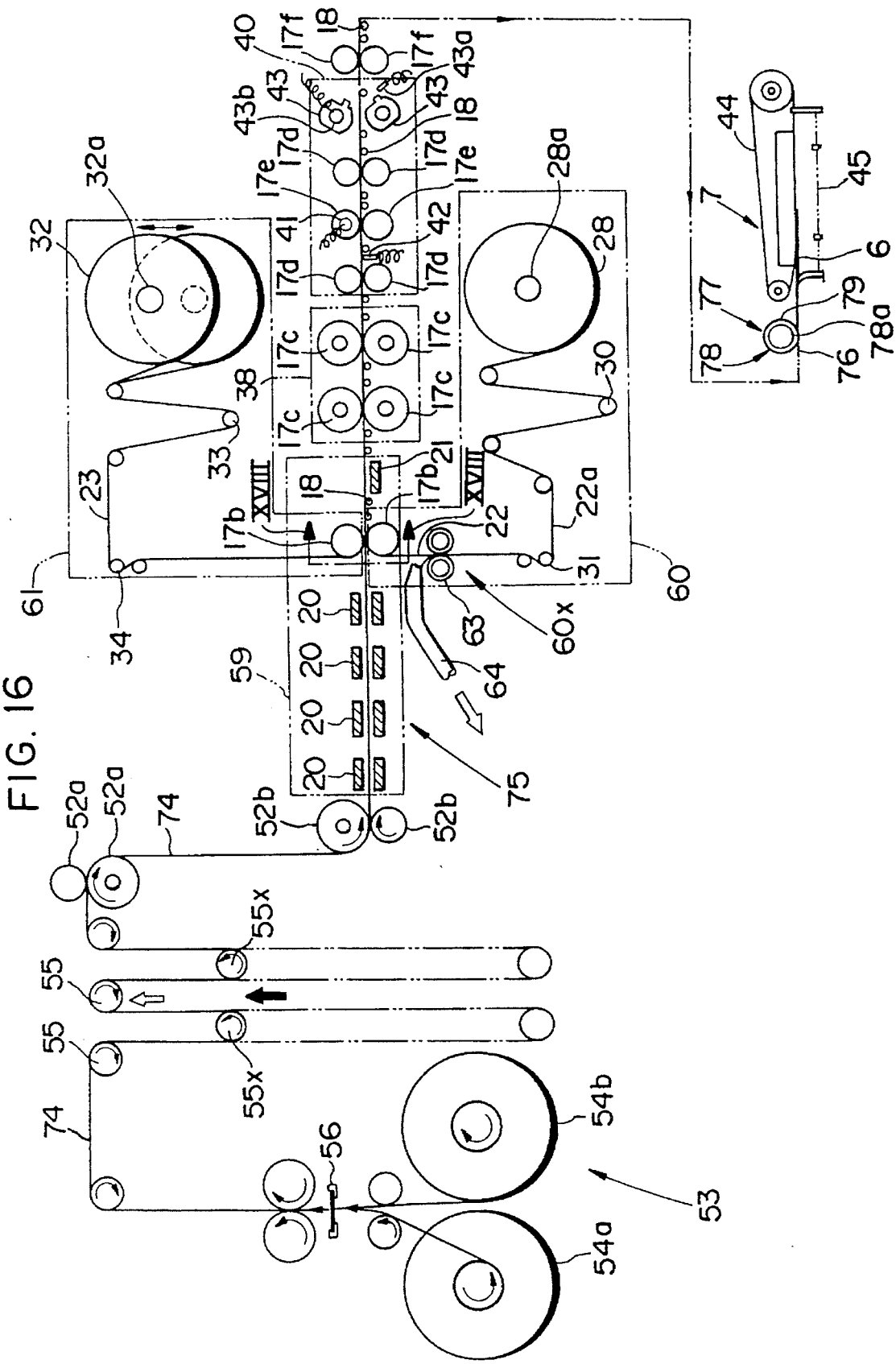
FIG. 16 is a side elevational view illustrating the apparatus of FIG. 15.

Referring now to FIGS. 15 and 16, the outline of the surface-treating apparatus of this embodiment will be described. This apparatus is constructed so as to convey a can body blank material 75 in the form of a continuous band, which has a width thrice the length of a single can body blank 8, in its longitudinal direction, respectively press-bond a plurality of printed biaxially-stretched polyethylene terephthalate films 22 (hereinafter called "film 22") and a plurality of plain polyethylene terephthalate films 23 (hereinafter call "film 23") to both sides of the can body blank material 74 in the course of its traveling, and then cut and divide the can body blank material 74 thus treated, thereby providing individual blanks for a single can body.

Namely, in FIGS. 15 and 16, reference character 75 indicates a conveying path for conveying a can body blank material 74 in the form of a continuous band. On the upstream side of the conveying path 75, there is provided a material-feeding means 53 for feeding the can body blank material 74 to the conveying path 75. On the downstream side of the conveying path 66, there is provided a dividing means 77 for dividing a surface-treated can body blank material 76, which is obtained by respectively press-bonding the film 22 and the film 23 to both sides of the can body blank material 74 as will be described subsequently, into widths corresponding to the length of a blank 8 for a single can body. In addition, a driving-out means 7 and a dividing means 9, which have the same construction as that in the third embodiment, are connected to the dividing means 77. Finally, individual blanks 8 for a single can body are provided by the dividing means 9.

As shown in FIG. 16, a heating means 59, a cooling means 38 and a cutting means 40, which have the same construction as that in the third embodiment, are also provided in the course of the conveying path 75. In addition, film-feeding means 60 and 61, which basically have the same construction as that in the third embodiment, are provided respectively below and above the conveying path 75.

As illustrated in FIG. 16, the conveying path 75 basically has the same construction as that in the second embodiment (see FIG. 4) and includes each pair of feed rolls 52a, 52b, a pair of pressure rolls 17b, each pair of cooling rolls 17c, 17c, each pair of even speed feed rolls 17d, 17e, 17d, and a pair of feed rolls 17f in order from its upstream side, each pair of said rolls being arranged vertically. Auxiliary rollers 18 are suitably arranged before and/or behind the rolls 52b and 17b–17f. As with the second embodiment, the can body blank material 74 fed to the conveying path 75 is held in nips between each pair of rolls 52a, 52b, 17b–17f, and moreover supported on the auxiliary rollers 18, thereby conveying it in its longitudinal direction.

As shown in FIG. 16, the material-feeding means 53 basically has the same construction as that in the second embodiment (see FIG. 4), and is constructed so as to feed the can body blank material 74 in the form of a continuous band from one of coils 54a, 54b, which have been obtained by winding the can body blank material 74 to the feed rolls 52a through a plurality of festoon rolls 55. In this case, the trailing edge of the can body blank material 74 fed from one coil 54a or 54b is welded to the leading edge of the can body blank material 74 fed from the other coil by the spot welder 56 provided on the upper side between the coils 54a, 54b so as to join both blank materials to each other where the can body blank material 74 of said one coil runs out.

One set of festoon rolls 55x, 55x of the festoon rolls 55 are vertically movable according to the tension of the can body blank material 74.

The film-feeding means 60 basically has the same construction as that in the third embodiment (see FIG. 8), and is constructed so as to feed a wider film 22a, on which print patterns 24 sufficient for the number of rows of the film 22 have been printed, from a film coil 28 toward the pressure rolls 17b through dancer rolls 30 and an edge controller 31 and divide the film 22a into films 22 having a width corresponding to a row of the print patterns 24 by a dividing device 60x in the course of the traveling of the film 22a.

In this case, as illustrated in FIG. 17, the print patterns 24 forming a row in the longitudinal direction of the film 22a and eye spots 26 are successively printed on the film 22a in three rows in the width direction of the film 22a. A plain area 62 corresponding to a metal-exposed area 48 for a welding part in a single can body blank 8 is defined between adjacent rows of the print patterns 24. This film 22a is cut at the plain areas 62 between the rows of the print patterns 24 to divide it into individual rows of the print patterns 24, thereby obtaining three continuous films 22 each having the print patterns 24 arranged in a row.

The dividing device 60x serves to divide the film 22a as described above, and is composed of a trim slitter 63 for cutting the film 22a at the plain areas 62 between the adjacent rows of the print patterns 24 and cutting off the plain area 62, and suction ducts 64 for discharging the plain areas 62 cut off. As illustrated in FIG. 17, the trim slitter 63 cuts off the plain areas 62 by rotary knives 63b, 63b rotatably supported on its support shaft 63a. The number of the suction ducts 64 is two according to the number of cut-off portions 62a.

The film-feeding means 61 includes a film coil 32, dancer rolls 33 and an edge controller 34, which have the same construction as that in the third embodiment. In this case, sets of these coil 32, dancer rolls 33 and edge controller 34 are arranged in three rows in parallel with each other.

As illustrated in FIGS. 15 and 16, the dividing means 77 is connected to the feed rolls 17f, which are situated at the downstream end of the conveying path 75, on their downstream side, and is composed of a slitter 78 in which a plurality of rotary knives 79 are rotatably supported at predetermined intervals on the support shaft 78 extending in the width direction of the conveying path 75. Four rotary knives 79 are supported on the support shaft 78a of the slitter 78 at even intervals according to the length of a single can body blank 8.

The operation of the surface-treating apparatus according to this embodiment will next be described.

In the surface-treating apparatus of this embodiment, the can body blank material 74 in the form of a continuous band is fed from the material-feeding means 53 to the conveying path 75 in the same manner as in the second embodiment and then conveyed in its longitudinal direction through each pair of the rolls 52a, 52b, 17b–17f and the auxiliary rollers 18. In this case, the can body blank material 74 has a width of 622.2 mm so as to permit its division into three portions having a width corresponding to the length of a single can body blank 8, for example, of 206.4 mm, said can body blank material 74 having trimming widths of each 1.5 mm at both side edges thereof.

In the course of the traveling, the can body blank material 74 is first heated by the heating means 59 in the same manner as in the second embodiment. Printed films 22 and plain films 23 fed from the film-feeding means 60 and 61, respectively, are then respectively press-bonded to both sides of the can body blank material 74.

At this time, the film 22a drawn out of the film coil 28 is cut along the longitudinal direction by the trim slitter 63 in the course of its feeding in the same manner as in the third embodiment, and then fed to the pressure rolls 17b.

Namely, as illustrated in FIG. 17, the film 22a is cut along the longitudinal direction by the trim slitter 63 at the plain areas 62 in the width direction, thereby dividing the film 22a into five of three films 22, on which the print patterns 24 and the eye spots 26 have been successively printed at intervals of a plain area 25 or 25a in the longitudinal direction, and two cut-off portions 62a between these films. The cut-off portions 62a are sucked in the suction ducts 64 to discharge and remove them. The films 22 obtained by dividing the film 22a are narrower in width than the length of a single can body blank 8 because the plain areas 62 are removed. Three films 22 obtained by dividing in the above-described manner are fed to the pressure rolls 17b in a state arranged in parallel with each other in the width direction.

With respect to the plain film 23, three films are provided according to the number of the print patterns in the width direction. These films 23 are drawn out of the individual film coils 32, and fed to the pressure rolls 17b in the same manner as in the third embodiment.

As illustrated in FIG. 18, the films 22, 23 fed to the pressure rolls 17b are simultaneously press-bonded under heat to different sides of the can body blank material 74 by the pressure rolls 17b. At this time, the films 22, 23 are positioned in the width direction of the can body blank material 74 under control through the respective edge controllers 31, 34, and hence respectively press-bonded to the can body blank material 74 by threes at intervals of the metal-exposed area 48 for welding parts. The metal-exposed areas 48 for welding parts are also defined at both side edges along the longitudinal direction of the can body blank material 74. Incidentally, the metal-exposed areas 48 for welding parts between the adjacent films has a width twice the width of the metal-exposed area 48 defined at either edge of the blank material 74.

Since the films 22 press-bonded to the can body blank material 74 are fed by dividing the original film 22a before their press-bonding, the print patterns 24 printed on the individual films 22 maintain the same positional relation as that prior to the division under the control of a film part 22a before division. Accordingly, in the continuous can body blank material 74, the positions of the print patterns 24 on the films 22 press-bonded to the can body blank material 74 are aligned with each other in the width direction of the can body blank material 74 as shown in FIG. 19. Therefore, there is no potential problem that positions of the print patterns 24 on the individual films 22 are different from each other before and behind in the width direction of the can body blank material 74 because the can body blank material 74, on which the films 22 have been press-bonded, is of a single material.

Incidentally, although the printed films 22 are practically press-bonded on the lower side of the can body blank material 74, the drawings in FIGS. 15 and 19 illustrate the can body blank materials 74 with the side on which the films 22 have been press-bonded upside for convenience of illustration.

The can body blank material 74, on which the films 22, 23 have been press-bonded, is cooled by the cooling means 38 and then cut by the cutting means 40.

The cutting by the cutting means 40 is performed in exactly the same manner as in the aforesaid embodiments. The can body blank material 74 is cut into predetermined lengths, for example, every seven print patterns, at a position of the plain area 25a (see FIG. 19).

By this cutting operation, surface-treated can body blank materials 76, which have a predetermined length, and on which the films 22, 23 have been respectively press-bonded by threes to both sides thereof, are obtained. Since the width of the surface-treated can body blank materials 76 thus obtained is yet thrice the length of a blank 8 for a single can body, they are then guided to the dividing means 77 to cut them into widths sufficient for a blank 8 for a single can body. This cutting is carried out by the slitter 78 in the same manner as in the fourth embodiment. Namely, each of the surface-treated can body blank materials 76 is divided by the slitter 78 along the longitudinal direction at the metal-exposed area 48 for welding part into widths sufficient for the length of the single can body blank 8, for example, 206.4 mm, thereby obtaining three surface-treated can body blank materials 6 at the same time. In the surface-treated can body blank material 6, the films 22, 23 are respectively press-bonded on both sides thereof with metal-exposed areas 48 left at both side edges in the longitudinal direction.

Thereafter, each of the surface-treated can body blank materials 6 is divided into individual blanks 8 for a single can body through the driving-out means 7 and the dividing means 9 in the same manner as in the third and fourth embodiments. Seven blanks for a single can body are obtained at the same time.

According to the surface-treating apparatus of this embodiment, as described above, it is possible to obtain a great number of can body blanks 8 from the continuous can body blank material 74 with high efficiency. In this case, three films 22 press-bonded to the can body blank material 74 are accurately aligned in the width direction of the can body blank material 65 with respect to the position of the print patterns 24 printed thereon, so that surface-treated can body blank materials 6 equal to each other can be obtained with ease. It is therefore possible to obtain a great number of can body blanks 8 with extremely high efficiency.

The can body blanks 8 obtained in the above-described embodiments are covered with the printed film 22 on one side, Which will become an outer surface of a can to be formed, and with the plain film 23 on the other side, which will become an inner surface of the can, except for the metal-exposed areas 48 situated at both side edges of both surfaces. The individual can body blanks 8 are divided in such a manner that the print patterns 24 printed on the film 22 respectively correspond to the can body blanks 8. Therefore, when the metal-exposed areas 48 are welded to each other with the surface coated with the printed film 22 outside, it is possible to protect the contents in the can from change of flavor, to prevent the base metal from corroding, and also to protect the outer surface of the can, and moreover to provide cans having an excellent aesthetic appearance. In addition, the printed surface of the film 22 can be protected by press-bonding the film 22 with the printed surface inside.

Although the can body blank 8 may be welded as it is to obtain a can body, it may be subjected to trimming such as cutting of peripheral useless parts if desired.

In particular, the calendering direction of the base metal corresponds to a direction connecting the metal-exposed areas 48 situated at both side edges in the can body blanks 8 obtained in the first, third and fourth embodiments. Therefore, in a can body obtained by overlapping and welding the metal-exposed areas 48 situated at both side edges of such a can body blank 8 to each other, the circumferential direction of the can body corresponds to the calendering direction of the base metal. Since a metal sheet generally tends to stretch along its calendering direction, no cracks occur when flanges are formed at both ends of the can body described above. It is therefore possible to advantageously conduct flanging or the like. When a can end is double seamed to a flange part formed on such a can body as described above, it is possible to prevent the contents in the can from leaking through the flange part after the seaming of the can end because no cracks occur at the flange part.

In the above-described embodiments, the heating of the can body blank material 1, 50, 65 or 74 has been conducted by the feed rolls 17a or 52b combined with the induction heating jacket rolls, the high-frequency heater 20 and the high-frequency temperature controller 21. However, a part or the whole of these heating devices may be changed with a heating oven. In order to enhance the adhesion of the films, a heating oven or the like may be provided behind the feed rolls 17f to reheat the surface-treated can body blank material.

In the aforesaid embodiments, the press-bonding of the films 22, 23 to the can body blank material 1, 50, 65 or 74 has been carried out by press-bonding under heat the films 22, 23 to the heated can body blank material 1, 50, 65 or 74 without using any adhesive. The films may however be press-bonded under heat through an adhesive layer. In this case, epoxy-phenol adhesives may be preferred as such an adhesive. Such an adhesive may be preferably coated on the films 22, 23 in advance.

The can body blank material 1, 50, 65 or 74 may preferably be coated with a white paint or ink on a side, which will become an outer surface of a can to be formed. Such coating has an advantageous effect that when the printed film 22 is press-bonded thereto, the print becomes brighter.

With respect to the films 22 and 23, a biaxially-stretched film is used as the film 22 because it is printed on its surface and hence requires high strength. On the other than, the film 23 requires no great strength because it is not subjected to printing, and hence may be either an unstretched film or a uniaxially- or biaxially-stretched film.

In the aforesaid embodiment, since the pressure rolls 17b combined with the feed rolls on the conveying path are used as a means for press-bonding the films 22, 23 to the can body blank material 1, 50, 65 or 74, it is possible to simplify the construction of the surface-treating apparatus of the present invention.

Furthermore, it is possible to improve the press-bonding tendency of the films 22, 23 to the can body blank material 1, 50, 65 and 74 by giving a temperature-controlling function to the pressure rolls 17b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A surface-treating apparatus for producing can body blanks, comprising:

original sheet-cutting means for cutting an original sheet into a plurality of can body blank materials each having a predetermined width and being further dividable into a plurality of blanks for a plurality of can bodies;

a conveying path for conveying the can body blank materials obtained by the cutting means by separately holding the can body blank materials between a plurality of pairs of feed rolls;

material-feeding means for intermittently feeding the can body blank materials to the conveying path;

heating means provided along the conveying path for heating the can body blank materials which are conveyed in a row in a conveying direction along the conveying path;

a continuous biaxially-stretched polyester film on which a print pattern corresponding to a blank for a single can body and an identification mark have been printed successively at predetermined intervals, the film having a width shorter than said predetermined width of said can body blank materials;

first film-feeding means provided on one side of the can body blank materials for feeding said biaxially-stretched polyester film to one side of the can body blank materials along the conveying direction of the can body blank materials, said first film-feeding means comprising feed rollers having predetermined widths and disposed with respect to said conveying path such that said biaxially-stretched polyester film is fed to a predetermined position on said one side of said can body blank materials wherein side edges of said can body blank materials extend beyond both side edges of said biaxially-stretched polyester film;

first press-bonding means for successively press-bonding under heat the biaxially-stretched polyester film fed by the first film-feeding means to said one side of the can body blank materials heated by the heating means at said predetermined position according to a traveling position thereof, and the first press-bonding means moreover coupling the can body blank materials forming a row in the conveying direction in a continuous form by the biaxially-stretched polyester film while defining metal-exposed areas, the metal-exposed areas being used as welding parts of the blank for a single can body and being disposed at edge portions of the can body blank materials along said both side edges of the biaxially-stretched polyester film;

a continuous plain polyester film having a width shorter than said predetermined width of said can body blank materials;

second film-feeding means provided on another side of the can body blank materials for feeding said plain polyester film to the other side of the can body blank materials along the conveying direction of the can body blank materials, said second film-feeding means comprising feed rollers having predetermined widths and disposed with respect to said conveying path such that said plain polyester film is fed to a predetermined position on said other side of said can body blank materials wherein side edges of said can body blank materials extend beyond both side edges of said plain polyester film;

second press-bonding means for successively press-bonding under heat the plain polyester film fed by the second film-feeding means to the other side of the can body blank materials heated by the heating means of said predetermined position according to a traveling position thereof, and the second press-bonding means moreover coupling the can body blank materials forming a row in the conveying direction in a continuous form by the plain polyester film while defining metal-exposed areas, the metal-exposed areas being used as welding parts of the blank for a single can body and being at edge portions of the can body blank materials along said both side edges of the plain polyester film;

blank material-cutting means arranged on a downstream side of the first and second press-bonding means along the conveying path for cutting a continuous sheet of the blank materials along a width direction thereof at a space area between the adjacent print patterns when the identification marks printer on the biaxially-stretched polyester film on the blank materials are detected, thereby obtaining surface-treated can body blank materials;

driving-out means for driving the surface-treated can body blank materials out of the conveying path; and dividing means for dividing each of the surface treated can body blank materials driven out of the conveying path according to the individual print patterns, thereby obtaining a plurality of blanks for a plurality of can bodies.

2. The surface-treating apparatus as claimed in claim 1, wherein the original sheet-cutting means cuts the original sheet in such a manner that the width direction of the can body blank material corresponds to the calendering direction of the original sheet, and the material-feeding means feeds the can body blank material to a conveying path in such a manner that a direction generally perpendicular to the width direction of the can body blank material corresponds to the conveying direction of the conveying path.

3. The surface-treating apparatus as claimed in claim 1, wherein the can body blank material is sized with a width thereof being generally equal to the length of a blank for a single can body, and a plurality of can body blanks being dividable in a direction generally perpendicular to the width direction of the can body blank material and generally in parallel with each other, and the material-feeding means feeds the can body blank material to the conveying path in such a manner that a direction generally perpendicular to the width direction of the can body material corresponds to the conveying direction of the conveying path.

4. The surface-treating apparatus as claimed in claim 3, wherein the driving-out means drives out the surface-treated can body blank material in the width direction of the surface-treated can body blank material, and the dividing means divides the surface-treated can body blank material at the space areas between the adjacent print patterns into the individual can body blanks by a slitter having a plurality of rotary knives arranged generally in parallel with the driving-out direction of the surface-treated can body blank material.

5. The surface-treating apparatus as claimed in claim 1, wherein the first film-feeding means feeds the biaxially-stretched polyester film to the can body blank material with its printed side facing the can body blank material, and the first press-bonding means press-bonds the printed film under heat to the can body blank material with the printed surface being on an inside.

6. The surface-treating apparatus as claimed in claim 1, wherein the first and second press-bonding means are composed respectively of a pair of pressure rolls which are vertically arranged and combined with the feed rolls on the conveying path, the first and second film-feeding means feed separately said both films into a pair of the pressure rolls with the can body blank material to be held in a nip between the pressure rolls interposed therebetween.

7. The surface-treating apparatus as claimed in claim 6, wherein the pressure rolls have a temperature-controlling function.

8. The surface-treating apparatus as claimed in claim 7, wherein the heating means are provided on both upstream and downstream sides of the pressure rolls.

9. The surface-treating apparatus as claimed in claim 6, wherein the material-feeding means feeds the can body blank material to the conveying path at the time when the identification marks printed on the biaxially-stretched polyester film fed from the first film-feeding means to the pressure rolls are continuously detected to detect a predetermined identification mark, whereby the can body blank material is fed to the conveying path in such a manner that a space area between adjacent print patterns printed on the biaxially-stretched polyester film is aligned with an interval between the can body blank materials forming a row in the conveying direction upon their entry into the pressure rolls.

10. The surface-treating apparatus as claimed in claim 7, wherein the blank material-cutting means cut the continuous sheet at intervals between the can body blank materials formed in a row in the conveying direction of the continuous sheet.

11. The surface-treating apparatus as claimed in claim 10, wherein the blank material-cutting means includes a cutting device for cutting the continuous sheet in its width direction, and the cutting device being actuated in response to the detection of the predetermined identification mark printed on the biaxially-stretched polyester film bonded to the continuous sheet, thereby cutting the continuous sheet at intervals between the can body blank materials.

12. The surface-treating apparatus as claimed in claim 1, wherein the conveying path conveys the can body blank materials in a state that they have been arranged in plural rows in a direction generally parallel to the conveying direction thereof, the material-feeding means simultaneously feeds a plurality of the can body blank materials to the conveying path in a state that they have been arranged in rows at predetermined intervals in a direction generally parallel to the conveying direction, the rows of can body blank materials being simultaneously conveyed along the conveying path to at least the first and second film-feeding means, the first and second film-feeding means respectively feed said both films to both sides of the can body blank materials of the individual rows of the can body blank materials arranged in the direction generally parallel to the conveying direction, and the first and second press-bonding means respectively successively press-bond under heat said both films to the can body blank materials of the individual rows of the can body blank materials arranged in the direction generally parallel to the conveying direction according to their traveling, thereby forming continuous sheets of the can body blank materials of the individual rows.

13. The surface-treating apparatus as claimed in claim 12, wherein the first film-feeding means includes:

means for feeding a second continuous biaxially-stretched polyethylene terephthalate film on which a print pattern corresponding to a blank for a single can body and an identification mark have been printed successively at predetermined intervals in a longitudinal direction, and moreover these print patterns and identification marks have been printed at predetermined intervals in the width direction of the second film in rows according to the individual rows of the can body blank materials arranged in the direction generally parallel to the conveying direction, to one of the sides of the can body blank materials conveyed in the plural rows along the conveying path, and means for dividing the second biaxially-stretched polyester film in the course of its feeding into films having a width narrower than the length of the blank for a single can body at intervals of the print pattern of the individual rows by cutting portions corresponding to the metal-exposed areas for welding parts in a single can body blank from the space areas between the print patterns in the width direction of the second film off along the longitudinal direction of the second film, said divided films being respectively fed to the can body blank materials of the individual row, which are being conveyed along the conveying path.

14. The surface-treating apparatus as claimed in claim 1, wherein the can body blank material is formed in such a size that its width corresponds to the length of plural blanks for a single can body, and a plurality of can body blanks are dividable in a direction generally perpendicular to the width direction of the can body blank material and generally in parallel with each other, the material-feeding means feeds the can body blank material to the conveying path in such a manner that a direction generally perpendicular to the width direction of the can body blank material corresponds to the conveying direction of the conveying path, the first and second film-feeding means respectively feed said both films in a predetermined manner to the can body blank material with the films arranged in the width direction being generally perpendicular to the conveying direction of the can body blank material, the first and second press-bonding means respectively successively press-bond under heat the predetermined number of said both films to the can body blank material with the films arranged in the width direction generally perpendicular to the conveying direction according to their traveling direction, thereby forming a continuous sheet of the can body blank materials, and the second dividing means for dividing the surface-treated can body blank materials, which have been obtained by cutting the continuous sheet by the cutting means, into widths corresponding to the length of the single can body blank at positions between the films arranged in the width direction is provided between the blank material-cutting means and the driving-out means in the conveying path.

15. The surface-treating apparatus as claimed in claim 14, wherein the first film-feeding means includes:

means for feeding a second continuous biaxially-stretched polyethylene terephthalate film on which a print pattern corresponding to a blank for a single can body and an identification mark have been printed successively at predetermined intervals in a longitudinal direction, and moreover these print patterns and identification marks have been printed at predetermined intervals in the width direction of the second film in rows of the predetermined number according to the width of the can body blank material, to one side of the can body blank material conveyed along the conveying path, and means for dividing the second biaxially-stretched polyester film in the course of its feeding into films having a width narrower than the length of the blank for a single can body at intervals of the print pattern of the individual rows by cutting portions corresponding to the metal-exposed areas for welding parts in a single can body blank from the space areas between the print patterns in the width direction of the second film off along the longitudinal direction of the second film, said divided films being fed to the can body blank material, which are being conveyed along the conveying path, generally in parallel with each other.

16. A surface-treating apparatus for producing can body blanks, comprising:

a conveying path for conveying a continuous can body blank material having a predetermined width in a longitudinal direction of the can body blank material by holding the can body blank material between a plurality of pairs of rolls;

material-feeding means for intermittently feeding the can body blank material to the conveying path;

heating means provided along the conveying path for heating the can body blank material conveyed in the longitudinal direction along the conveying path;

a continuous biaxially-stretched polyester film on which a print pattern corresponding to a blank for a single can body and an identification mark have been printed successively at predetermined intervals, the film having a width shorter than said predetermined width of said can body blank material;

first film-feeding means provided on one side of the can body blank material for feeding said biaxially-stretched polyester film to one side of the can body blank material along the longitudinal direction of the can body blank material, said first film-feeding means comprising feed rollers having predetermined widths and disposed with respect to said conveying path such that said biaxially-stretched polyester film is fed to a predetermined position on said one side of said can body blank material wherein side edges of said can body blank material extend beyond both side edges of said biaxially-stretched polyester film;

first press-bonding means for continuously press-bonding under heat the biaxially-stretched polyester film fed by the first film-feeding means to said one side of the can body blank material heated by the heating means at said predetermined position according to a traveling position thereof, and moreover defining metal-exposed areas, which are used as welding parts of the blank for a single can body and being disposed at edge portions of the can body blank material along said both side edges of the biaxially-stretched polyester film;

a continuous plain polyester film having a width shorter than said predetermined width of said can body blank material;

second film-feeding means provided on another side of the can body blank material for feeding said plain polyester film to the other side of the can body blank material along the longitudinal direction of the can body blank material, said second film-feeding means comprising feed rollers having predetermined widths and disposed with respect to said conveying path such that said plain polyester film is fed to a predetermined position on said other side of said can body blank material wherein side edges of said can body blank material extend beyond both side edges of said plain polyester film;

second press-bonding means for continuously press-bonding under heat the plain polyester film fed by the second film-feeding means to the other side of the can body blank material heated by the heating means at said predetermined position according to a traveling position thereof, and moreover defining metal-exposed areas, which are used as welding parts of the blank for a single can body and being disposed at edge portions of the can body blank material along said both side edges of the plain polyester film;

blank material-cutting means arranged on a downstream side of the first and second press-bonding means along the conveying path for cutting the can body blank material along a width direction thereof at a space area between the adjacent print patterns when the identification marks printed on the biaxially-stretched polyester film press-bonded to the can body blank material are detected, thereby obtaining surface-treated can body blank materials with both said polyester films respectively press-bonded under heat to both sides thereof;

driving-out means for driving the surface-treated can body blank material out of the conveying path; and dividing means for dividing each of the surface treated can body blank materials driven out of the conveying path according to the individual print patterns, thereby obtaining a plurality of blanks for a plurality of can bodies.

17. The surface-treating apparatus as claimed in claim 16, wherein the can body blank material is sized with a width thereof being generally equal to the length of a blank for a single can body, the driving-out means drives out the surface-treated can body blank material in the width direction of the surface-treated can body blank material, and the dividing means divides the surface-treated can body blank material at the space areas between the adjacent print patterns into the individual can body blanks by a slitter having a plurality of rotary knives arranged generally in parallel with the driving-out direction of the surface-treated can body blank material.

18. The surface-treating apparatus as claimed in claim 16, wherein the first film-feeding means feeds the biaxially-stretched polyester film to the can body blank material with its printed side facing to the can body blank material, and the first press-bonding means press-bonds the printed film under heat to the can body blank material with the printed surface being on an inside.

19. The surface-treating apparatus as claimed in claim 16, wherein the first and second press-bonding means are composed respectively of a pair of pressure rolls which are vertically arranged and combined with the feed rolls on the conveying path, the first and second film-feeding means feed separately said both films into a pair of the pressure rolls with the can body blank material to be held in a nip between the pressure rolls interposed therebetween.

20. The surface-treating apparatus as claimed in claim 19, wherein the pressure rolls have a temperature-controlling function.

21. The surface-treating apparatus as claimed in claim 20, wherein the heating means are provided on both upstream and downstream sides of the pressure rolls.

22. The surface-treating apparatus as claimed in claim 16, wherein the can body blank material is sized with a width thereof corresponding to the length of plural blanks for a single can body, the first and second film-feeding means respectively feed said both films in a predetermined number corresponding to the width of the can body blank material to the can body blank material with the films arranged in the width direction of the can body blank material, the first and second press-bonding means respectively successively press-bond under heat the predetermined number of said both films to the can body blank material with the films arranged in the width direction according to their traveling direction, and the second dividing means for dividing the surface-treated can body blank materials, which have been obtained by cutting the can body blank material with said both films respectively press-bonded to both sides thereof by the cutting means, into widths corresponding to the length of the single can body blank at positions between the films arranged in the width direction is provided between the blank material-cutting means and the driving-out means in the conveying path.

23. The surface-treating apparatus as claimed in claim 22, wherein the first film-feeding means includes:

means for feeding a continuous second biaxially-stretched polyethylene terephthalate film, on which a print pattern corresponding to a blank for a single can body and an identification mark have been printed successively at predetermined intervals in a longitudinal direction, and moreover these print patterns and identification marks have been printed at predetermined intervals in the width direction of the second film in rows of the predetermined number according to the width of the can body blank material, to one side of the can body blank material conveyed along the conveying path, and means for dividing the second biaxially-stretched polyester film in the course of its feeding into films having a width narrower than the length of the blank for a single can body at intervals of the print pattern of the individual rows by cutting portions corresponding to the metal-exposed areas for welding parts in a single can body blank from the space areas between the print patterns in the width direction of the second film off along the longitudinal direction of the second film, said divided films being fed to the can body blank material, which are being conveyed along the conveying path, generally in parallel with each other.

24. The surface-treating apparatus as claimed in claim 1, further comprising cooling means arranged on a downstream side of the heating means and the first and second press-bonding means in the conveying path for cooling the continuous sheet of the can body blank materials with both of said polyester films respectively press-bonded under heat to both sides thereof so as to couple the can body blank materials in a continuous form, the blank material-cutting means being on a downstream side of the cooling means.

25. The surface-treating apparatus as claimed in claim 1, wherein the biaxially-stretched polyester film and the polyester film have adhesive coated thereon.

26. The surface-treating apparatus as claimed in claim 16, further comprising cooling means arranged on a downstream side of the heating means and the first and second press-bonding means in the conveying path for cooling the continuous sheet of the can body blank materials with both of said polyester films respectively press-bonded under heat to both sides thereof so as to couple the can body blank materials in a continuous form, the blank material-cutting means being on a downstream side of the cooling means.

27. The surface-treating apparatus as claimed in claim 16, wherein the biaxially-stretched polyester film and the polyester film have adhesive coated thereon.

28. The surface-treating apparatus as claimed in claim 1, wherein:

the first film-feeding means is disposed downstream of the original sheet-cutting means such that the first film-feeding means feeds the biaxially-stretched polyester film to the one side of the can body blank materials after the original sheet-cutting means has cut the original sheet into the plurality of can body blank materials;

the second film-feeding means is downstream of the original sheet-cutting means such that the second film-feeding means feeds the plain polyester film to the other side of the can body blank materials after the original sheet-cutting means has cut the original sheet into the plurality of can body blank materials; and the blank material-cutting means is arranged on a downstream side of the first and second press-bonding means and the first and second film-feeding means along the conveying path.

29. The surface-treating apparatus as claimed in claim 16, further comprising means for dividing the biaxially-stretched polyester film into a plurality of strips, the first film-feeding means simultaneously applying the plurality of strips to the one side of the can body blank material, the strips on the can body blank material being spaced from each other thereby providing the metal-exposed areas for welding parts in a single can body blank between the print patterns, the first press-bonding means for continuously press-bonding under heat the strips of the biaxially-stretched polyester film fed by the first film-feeding means to said one side of the can body blank material.

* * * * *